US000001388H

United States Statutory Invention Registration [19]

[11] Reg. Number: H1388

Matlack

[43] Published: Dec. 6, 1994

[54] POLYOLEFIN POLYMER AND METHOD OF MAKING SAME

[75] Inventor: Albert S. Matlack, Hockessin, Del.

[73] Assignee: Hercules Incorporated, Wilmington, Del.

[21] Appl. No.: 997,303

[22] Filed: Dec. 23, 1992

[51] Int. Cl.[5] ..... C08F 36/00
[52] U.S. Cl. ..... 526/283
[58] Field of Search ..... 526/283, 141

[56] References Cited

U.S. PATENT DOCUMENTS

| | | |
|---|---|---|
| 3,159,662 | 12/1964 | Ashby . |
| 3,220,972 | 11/1965 | Lamoreaux . |
| 3,715,334 | 2/1973 | Karstedt . |
| 4,028,119 | 6/1977 | Yamada et al. . |
| 4,400,340 | 8/1983 | Klosiewicz . |
| 4,436,858 | 3/1984 | Klosiewicz . |
| 4,458,037 | 7/1984 | Leach . |
| 4,481,344 | 11/1984 | Newburg . |
| 4,496,668 | 1/1985 | Newburg . |
| 4,496,669 | 1/1985 | Leach . |
| 4,507,453 | 3/1985 | Tom . |
| 4,520,181 | 5/1985 | Klosiewicz . |
| 4,535,097 | 8/1985 | Newburg . |
| 4,568,660 | 2/1986 | Klosiewicz . |
| 4,598,102 | 7/1986 | Leach . |
| 4,607,077 | 8/1986 | Silver et al. . |
| 4,657,981 | 4/1987 | Klosiewicz . |
| 4,661,575 | 4/1987 | Tom . |
| 4,689,380 | 8/1987 | Nahm . |
| 4,696,985 | 9/1987 | Martin . |
| 4,701,510 | 10/1987 | Minchak et al. . |
| 4,703,068 | 10/1987 | Nguyen . |
| 4,703,098 | 10/1987 | Matlack . |
| 4,708,969 | 11/1987 | Leach . |
| 4,710,408 | 12/1987 | Kraus . |
| 4,727,125 | 2/1988 | Nelson . |
| 4,731,395 | 3/1988 | Byrne et al. . |
| 4,740,537 | 4/1988 | Silver . |
| 4,751,337 | 6/1988 | Espy et al. . |
| 4,782,125 | 11/1988 | Newburg, deceased . |
| 4,808,635 | 2/1989 | Nguyen . |

(List continued on next page.)

FOREIGN PATENT DOCUMENTS

| | | |
|---|---|---|
| 0259215 | 3/1988 | European Pat. Off. . |
| 0374997 | 6/1990 | European Pat. Off. . |

OTHER PUBLICATIONS

Ed Bailer, *Comprehensive Inorganic Chemistry,* 1, pp. 960–968, (1973), Permagon Press, Oxford, England.
Chujo et al., *Encyclo. Polymer Sci. Eng.,* 2nd Ed., 14, pp. 638–639 (1988).
Dittmer et al., *Makromol. Chem.,* 190, pp. 1771–1790 (1989).
Doak, *Encyclo. Polymer Sci. Eng.,* 2nd Ed., 6, p. 390 (1986).
Duda et al., *Macromolecules,* 23, pp. 1640–1646 (1990).
Ivin, *Olefin Metathesis,* Academic Press, New York, pp.

(List continued on next page.)

*Primary Examiner*—Robert L. Stoll
*Assistant Examiner*—Joseph D. Anthony
*Attorney, Agent, or Firm*—Mark D. Kuller

[57] ABSTRACT

A polyolefin composition comprises repeating units of a metathesis polymerizable olefin monomer, a metathesis polymerization procatalyst, a metathesis polymerization procatalyst activator, and at least one member selected from the group consisting of: (i) a Lewis acid catalyst and a Lewis acid cocatalyst, effective to obtain a residual metathesis polymerizable olefin monomer level of from 0 to 0.25 weight percent, based on the weight of the polyolefin; (ii) an anionic polymerization catalyst; (iii) a free radical polymerization initiator; and (iv) a hydrosilation polymerization catalyst. The method for making the composition is also disclosed. The use of metathesis polymerization in conjunction with another type of polymerization can achieve a variety of beneficial effects, including a very low level of residual metathesis polymerizable monomer.

33 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS

| | | | |
|---|---|---|---|
| 4,812,543 | 3/1989 | Matlack et al. . | |
| 4,822,839 | 4/1989 | Paisner . | |
| 4,826,942 | 5/1989 | Nelson . | |
| 4,835,230 | 5/1989 | Khasat et al. . | |
| 4,877,820 | 10/1989 | Cowan . | |
| 4,882,401 | 11/1989 | Bell . | |
| 4,883,849 | 11/1989 | Matlack . | |
| 4,897,456 | 1/1990 | Nelson . | |
| 4,900,779 | 2/1990 | Liebfried . | |
| 4,900,799 | 2/1990 | Hara et al. . | |
| 4,902,560 | 2/1990 | Silver . | |
| 4,902,731 | 2/1990 | Liebfried . | |
| 4,918,039 | 4/1990 | Martin . | |
| 4,918,138 | 4/1990 | Hara et al. . | |
| 4,918,146 | 4/1990 | Matlack . | |
| 4,923,943 | 5/1990 | Hara et al. . | |
| 4,933,402 | 6/1990 | Matlack . | |
| 4,981,931 | 1/1991 | Bell . | |
| 5,008,360 | 4/1991 | Bard et al. . | |
| 5,053,256 | 10/1991 | Haag . | |
| 5,082,909 | 1/1992 | Bell . | |
| 5,095,082 | 3/1992 | Kelsey | 526/282 |

OTHER PUBLICATIONS

249–251 and 374 (1983).

Kaszas et al., *J. Appl. Polymer Sci.;* 39, pp. 119–144 (1990).

Ku, *Adv. Polymer Technol.,* 8, pp. 177–196, pp. 177–196, summer 1988.

Jordan et al., *Makromol. Chem.,* 190, pp. 267–276 (1989).

Macosko, *Fundamentals of Reaction Injection Molding,* Hanser Publishers, Munich, pp. 193–200 (1989).

Martin and Canon in Olah, Ed., *Friedel–Crafts and Related Reactions,* 1, pp. 399–419 (1963), Interscience, New York.

Massey, A. G., *Adv. Inorg. Radiochem.,* 10, pp. 19–26 (1967).

Pitt et al., *J. Appl. Polymer Sci.,* 26, pp. 3779–3787 (1981).

Plesch, *The Chemistry of Cationic Polymerization,* MacMillan, New York, pp. 158–159 (1963).

Norbert Seehof et al., "Ring–Opening Olefin Metathsis Polymerization of Fluoroalkyl–Substituted Polycyclic Olefins", *Makromol. Chem., Rapid Commun.,* 12, pp. 107–112 (1991).

Sheppard, *Encyclo. Polymer Sci. Eng.,* 2nd Ed., 2, pp. 143–157 (1985).

Sheppard et al., *Encyclo. Polymer Sci. Eng.,* 2nd Ed., 11, pp. 1–21 (1988).

Sheppard et al., *Encyclo. Chem. Technol.,* 3rd Ed., 13, p. 358 (1981).

*Advances in Organometallic Chemistry,* vol. 17, pp. 407 et seq.

Bassett et al., *The Journal of Inorganic Chemistry,* vol. 26, No. 25, pp. 4272–4277 (1987).

Dragutan et al., *Olefin Metathesis and Ring–Opening Polymerization of Cycloolefins,* John Wiley (1985).

Hara et al., C.A. 112, 36839 (1990).

English–language Abstract of Japanese Application No. 87012609, Aug. 1988.

English–language Abstract of Japanese Application No. 88207488, Mar. 1989.

English–language Abstract of Japanese Application No. 89024144, Dec. 1989.

English–language Abstract of Japanese Application No. 89285093, Jul. 1990.

*Advances in Organometallic Chemistry,* vol. 17, pp. 407–447 (1979).

Quignard, et al., *Inorganic Chemistry,* vol. 26, No. 25, pp. 4272–4277 and P.4277.M1–P.4277.M7 (1987).

Dragutan, et al., *Olefin Metathesis and Ring–Opening Polymerization of Cycloolefins,* pp. 14–26, John Wiley (1985).

*Chemical Abstracts,* 112:36839a (1990), (Chemical Abstract of Japanese Patent No. 01,163,212 [89,163,212], to Hara et al.).

POLYOLEFIN POLYMER AND METHOD OF MAKING SAME

BACKGROUND OF THE INVENTION

1. Field of the Invention

The present invention pertains to processes for the polymerization of olefins, notably strained ring polycyclic olefins, particularly dicyclopentadiene, as well as to the corresponding polymeric reaction product. The invention utilizes metathesis polymerization in combination with one or more of a variety of other catalysts selected from the group consisting of: a Lewis acid catalyst and cocatalyst, an anionic catalyst, a free radical initiator, and a hydrosilation catalyst. The processes of the present invention are particularly suited to manufacturing plastic articles via reaction injection molding (i.e. "RIM").

2. Background and Relevant Information

Preparation of thermoset cycloolefin polymers via metathesis catalysis is a relatively recent development in the polymer art. Klosiewicz, in U.S. Pat. Nos. 4,400,340 and 4,520,181, teaches preparation of cycloolefins via a twostream reaction injection molding technique wherein a first stream, comprising a metathesis polymerizable olefin (such as dicyclopentadiene) in admixture with a metathesis catalyst, and a second stream, comprisihg a metathesis polymerizable olefin (such as dicyclopentadiene) in admixture with metathesis catalyst activator, are combined in a mix head and immediately injected into a mold where, within a matter of seconds, polymerization and molding to a permanently fixed shape take place simultaneously. Klosiewicz also teaches the use of a reaction rate moderator in the activator stream to delay the catalyst activation until the reaction mass is totally within the mold. Klosiewicz states that the catalyst can be a tungsten halide or a tungsten oxyhalide, and that the activator can be tetrabutyl tin, or an alkylaluminum compound, and that the reaction rate moderator can be an ester, ether, ketone or nitrile.

U.S. Pat. No. 4,835,230 (to N.P. KHASAT et al.) relates to the use of a cationic polymerization initiator in the preparation of a thermoset polymer. Cationic polymerization initiators disclosed include protonic acids, Lewis acids and other cation generators such as alkyl perchlorates and ionizing radiation, and it is further disclosed that the cationic polymerization initiator can be used alone or in conjunction with a cocatalyst. KHASAT et al. utilizes a plurality of reactant streams in the polymerization of dicyclopentadiene, especially for RIM. KHASAT et al. states that the number of applications for thermoset polydicyclopentadiene has been somewhat limited because of the distinctive odor of the residual dicyclopentadiene monomer. Finally, KHASAT et al. states that the use of a cationic polymerization initiator can increase the glass transition temperature ($T_g$) and polymer heat deflection temperature (HDT) of thermoset dicyclopentadiene polymers and copolymers, and reduce residual monomer content without reducing impact strength.

U.S. Pat. No. 4,481,344, to Newburg (NEWBURG), relates to a method for making thermoset poly(dicyclopentadiene), and to the product so produced. NEWBURG states that although thermoset poly(dicyclopentadiene) is well suited for a wide variety of applications, particularly as an engineering plastic, there are a number of applications in which its use has been somewhat limited due to the distinctive odor of the residual dicyclopentadiene monomer. NEWBURG describes a two-part metathesis catalyst system in which the first part comprises a metathesis catalyst, and the second part comprises an activator, and wherein at least one part comprises a halogen-containing hydrocarbyl additive. The hydrocarbyl additive contains at least one trihalogen-substituted atom or at least one activated halogen atom. NEWBURG's Table I discloses various hydrocarbyl additives, and Table II provides results in terms of residual dicyclopentadiene monomer in various poly(dicyclopentadiene) products produced using various hydrocarbyl additives.

European Patent Application 0,374,997 relates to the polymerization of cyclic olefins in the presence of a catalyst comprising (a) a transition metal compound, (b) a co-catalyst, and (c) a boron halide compound. This application states that this catalyst has been found to exhibit high activity in the polymerization of dicyclopentadiene, and high conversion in a reaction injection molding process having a short induction time and relatively low polymerization temperature.

SUMMARY OF THE INVENTION

The present invention relates to a composition comprising: (A) a polyolefin comprising repeating units of a metathesis polymerizable olefin; (B) a metathesis polymerization procatalyst and a metathesis polymerization procatalyst activator; and (c) at least one member selected from the group consisting of:

i. a Lewis acid catalyst and a Lewis acid cocatalyst, effective to obtain a residual metathesis polymerizable olefin monomer level of from about 0 to 0.25 weight percent, based on the weight of the polyolefin;
ii. an anionic polymerization catalyst;
iii. a free radical polymerization initiator; and
iv. a hydrosilation polymerization catalyst and a monomer comprising a hydrosilane (≡Si—H) group.

The present invention also relates to a method for making the composition of the present invention. The method comprises combining a metathesis polymerizable olefin monomer with a metathesis polymerization procatalyst, a metathesis polymerization procatalyst activator, and at least one member selected from the group consisting of:

i. a Lewis acid catalyst and a Lewis acid cocatalyst, effective to obtain a residual metathesis polymerizable olefin monomer level of from 0 to 0.25 weight percent, based on the weight of the polyolefin;
ii. an anionic polymerization catalyst;
iii. a free radical polymerization initiator; and
iv. a hydrosilation polymerization catalyst and a monomer comprising a hydrosilane (≡Si—H) group.

The method is preferably carried out by providing a plurality of reactant streams which are mixed together to form a reaction mixture. The reaction mixture is formed into a desired shape before the polymerization of the metathesis polymerizable olefin.

Although the present invention relates to the polymerization of olefins in general, and more particularly to the polymerization of cycloolefins, the present invention is concerned with achieving one or more of a variety of effects. One of the most significant effects is achieving a low level of residual metathesis polymerizable olefin monomer in a polymeric reaction product comprising repeating units of a metathesis polymerizable olefin. Other effects include increasing polymer $T_g$, increasing polymer impact strength, improving polymer stiffness, improving polymer heat distortion temperature, improving polymer oxidative heat stability, and reducing polymer odor.

DETAILED DESCRIPTION OF THE INVENTION

In general, the metathesis polymerizable olefin monomer may be any monomer which can be polymerized in the presence of one or more metathesis catalysts. Cycloolefins comprise a preferred group of metathesis polymerizable olefinic monomers. Metathesis-polymerizable, strained-ring, non-conjugated polycyclic cycloolefins comprise a group of still more preferred olefins useful in the process of the present invention. Most strained-ring, non-conjugated, polycyclic cycloolefins are metathesis polymerizable.

More specifically, preferred metathesis polymerizable monomers include cycloolefins of the norbornene type, defined by the following formulas:

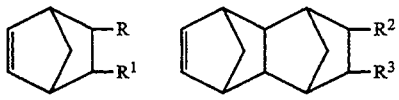

where R and $R^1$ are independently selected from hydrogen, alkyl groups of 1 to 20 carbon atoms, and saturated and unsaturated hydrocarbon cyclic groups formed by R and $R^1$ together with the two ring carbon atoms. $R^2$ and $R^3$ are independently selected from hydrogen and alkyl groups containing 1 to 20 carbon atoms.

Preferably, the metathesis polymerizable olefin comprises a norbornene group. Preferred monomers include, for example, dicyclopentadiene, higher cyclopentadiene oligomers (such as trimers and higher oligomers of cyclopentadiene), norbornenes, norbornadiene, 4-alkylidene norbornene, dimethanooctahydronaphthalene, and dimethanohexahydronaphthalene, as well as substituted derivatives of these compounds.

The most preferred cyclic olefin monomer for use in the present invention is dicyclopentadiene, i.e. most preferably the polyolefin comprises repeating units of dicyclopentadiene. Preferably, the polyolefin comprises repeating units of dicyclopentadiene in an amount of from about 1 to 100 weight percent, based on the weight of the polyolefin. Still more preferably, repeating units of dicyclopentadiene are present in an amount of from about 10 to 100 weight percent, based on the weight of the polyolefin. Most preferably, repeating units of dicyclopentadiene are present in an amount of from about 75 to 100 weight percent, based on the weight of the polyolefin.

Dicyclopentadiene may be used as the sole monomer in the polymerization, or the polymerization may be carried out using a mixture of dicyclopentadiene with other strained-ring hydrocarbons in ratios of 1 to 99 mole percent of either monomer, preferably about 75 to 100 mole percent dicyclopentadiene.

The most preferred dicyclopentadiene for preparing polymers according to the process of the present invention is commercially available endo-dicyclopentadiene (i.e., 3a,4,7,7a-tetrahydro-4,7-methano-1H-indene). The exo-isomer, while not commercially available, can be used just as well. In fact, it is present in commercially-available dicyclopentadiene at a relatively low level, e.g. 0.5% by weight. The preferred commercially available monomer normally has a purity of at least 97 weight percent and preferably at least 99 weight percent. The preferred commercially available monomer further comprises tricyclopentadiene (i.e. cyclopentadiene trimer) in an amount of from about 0 to 2 weight percent, as well as from about 0 to 2 weight percent of still other norbornene-group containing cycloolefins. The exo-isomer of dicyclopentadiene is generally present in commercially available dicyclopentadiene at a relatively low level, e.g. about 0.5 weight percent, based on the weight of the dicyclopentadiene.

Commercially available dicyclopentadiene should have a purity high enough to prevent impurities from inhibiting the polymerization. The low boiling fraction should be removed. This can be done by stripping away several percent of the unsaturated four to six carbon atom volatiles, i.e., the volatiles distilled below 100° C. at about 90±3 torr absolute pressure. It is often desirable to purify the starting material even further by treatment with an absorbent such as molecular sieves, alumina or silica gel. Additionally, the water content of the starting material should be below about 100 ppm. The presence of water interferes with polymerization by hydrolysis of both the catalyst and the activator components of the catalyst system. Water can be removed by azeotropic distillation under reduced pressure.

The metathesis polymerizable olefin, alone or in combination with other monomers present in the reaction mixture, polymerizes to form one or more polymers. The resulting polyolefin (or polyolefins) preferably comprises repeating units of the metathesis polymerizable olefin in an amount of from about 1 weight percent to 100 weight percent, based on the weight of the polyolefin. More preferably, repeating units of the metathesis polymerizable olefin monomer are present in the polyolefin in an amount of from about 10 weight percent to 100 weight percent, based on the weight of the polyolefin. Most preferably, repeating units of the metathesis polymerizable monomer are present in the polyolefin in an amount of from about 75 to 100 weight percent, based on the weight of the polyolefin.

The process of the present invention may also be carried out by the polymerization of a plurality of monomers. Each of the monomers may be metathesis polymerizable, or only one of the monomers may be metathesis polymerizable. The additional monomer (or monomers) may polymerize to form a copolymer, a graft copolymer, a homopolymer, and/or an interpenetrating polymer network (IPN).

Any one or more of the following cycloolefins may be used as additional monomers, e.g. monomers used in combination with dicyclopentadiene. Such monomers include: norbornene-type comonomers such as norbornene, methylnorbornene, vinylnorbornene, ethylidenenorbornene, 5-ethylidene-2-norbornene, as well as m-diisopropenylbenzene, polyisoprene, styrene, α-methylstyrene, β-pinene, p-diisopropenyl-benzene, diisobutylene, polyindane, dimethanohexahydronaphthalene, tetracyclododecene(1,4,5,8-dimethano-1,2,4a,5,8-,8a-octahydronaphthalene), methyltetracyclododecene, tetracyclododecadiene, 1,5,9-cyclododecatriene, 4-methylstyrene, dimethanohexahydronaphthalene, dimethanooctahydronaphthalene, and cyclopentadiene oligomers such as cyclopentadiene trimer (i.e. tricyclopentadiene, "CPT"), tetracyclopentadiene, and higher cyclopentadiene oligomers. In addition, compounds which can be alkylated, such as naphthalene, can be included.

Preferably the additional monomer is at least one member selected from the group consisting of: tricyclopentadiene, norbornene, 1,3-diisopropenylbenzene, 1,4-diisopropenylbenzene, α-methylstyrene, pinene, 5-ethylidene-2-norbornene, β-pinene, polyisoprene, diisobutylene, polyindane, acenaphthylene, 5,5'-sulfonylbis(2-norbornene), hexamethylene-bis(5-norbornene-2-carboxylate), 1,4,5,8-dimethano-1,4,4a,5,8,8a-hexahydronaphthalene, 1,5-cyclooctadiene, 1,5,9-cyclododecatriene, hexamethylcyclotrisiloxane, 4-methylstyrene, and poly(vinylbenzyl chloride).

Most preferably the additional monomer is 5-ethylidene-2-norbornene.

Any metathesis polymerizable olefin may also be polymerized alone or in combination with any one or more additional metathesis polymerizable olefins, whether listed above or not. In addition, other monomers which will vary with the type of the additional polymerization, may be utilized, such as: styrenes, vinyl-substituted aromatic compounds, and methacrylates, which are subject to free radical polymerization; caprolactone, hexaalkylcyclotrisiloxane, methacrylates, and styrenes, which are subject to anionic polymerization; styrenes, divinylbenzene, α-methylstyrene, terpenes (such as β-pinene), diisopropenyl-benzenes, diisobutylene, polyisoprene, polybutadienes, polystyrenes, copolymers of styrene and dienes, polyindanes, which are subject to polymerization by the combination of a Lewis Acid catalyst and a Lewis Acid cocatalyst; and polysiloxanes and siloxysilanes polymerizable by a hydrosilation polymerization catalyst. In addition, aromatic molecules which can be alkylated, such as hindered phenols, aromatic amines, and hydrocarbons (such as naphthalene), can be included.

The additional monomer is used in the process of the present invention (hence present in the composition) in an amount of from about 1 to 99 weight percent, based on the weight of the polyolefin. More preferably, the additional monomer is used in the process in an amount of from about 1 to 50 weight percent, based on the weight of the polyolefin. Most preferably, the additional monomer is present used in the process in an amount of from about 1 to 25 weight percent, based on the weight of the polyolefin.

Suitable metathesis polymerization procatalysts include molybdenum halides and tungsten halides, and their corresponding oxyhalides, especially those having two valences satisfied by oxygen rather than halogen. Such procatalysts are herein referred to as "standard procatalysts". Halides and oxyhalides of still other transition metals such as rhenium, tantalum, and niobium are also suitable for use as metathesis polymerization procatalysts.

Tungsten halides and oxyhalides are among the preferred procatalysts. Still more preferred are mixtures or complexes of tungsten hexachloride ($WCl_6$) and a tungsten oxytetrachloride ($WOCl_4$) in a molar ratio of $WOCl_4$ to $WCl_6$ of about 1:9 to 2:1. Such mixtures or complexes can be prepared by contacting essentially pure $WCl_6$ with a controlled portion of an oxygen donor. Useful oxygen donors include, e.g., a hydrated salt, water, a wet molecular sieve and alkyl alcohols. The most preferred oxygen donor is t-butanol. Details of a catalyst preparation can be found in Klosiewicz, U.S. Pat. Nos. 4,400,340 and 4,568,660, and U.S. Pat. No. 4,696,585, to Martin, each of which is hereby incorporated, in its entirety, by reference thereto. In particular, U.S. Pat. No. 4,696,585 describes, in column 16, line 35, through Column 19, line 22, the preparation of a metathesis catalysts which can serve as the metathesis procatalyst.

The tungsten or molybdenum compound is not normally soluble in the methathesis polymerizable olefin monomer, but can be solubilized by complexing it with a phenolic compound. The tungsten or molybdenum compound is first suspended in a small amount of an inert diluent such as benzene, toluene, xylene or chlorinated benzene, to form a 0.1 to 1 mole per liter slurry. The phenolic compound is added to the slurry in a molar ratio of about 1:1 to 1:3 catalyst compound to phenolic compound, followed by passing a stream of dry inert gas through the agitated solution to remove hydrogen chloride gas that is formed. Alternatively, a phenolic salt, such as a lithium or sodium phenoxide, can be added to a tungsten compound/organic solvent slurry, the mixture stirred until essentially all of the tungsten compound is dissolved, and the precipitated inorganic salt removed by filtration or centrifugation.

All of these steps should be carried out in the absence of moisture and air to prevent deactivation of the procatalyst. Preferred phenolic compounds include phenol, alkyl phenols, halogenated phenols or phenolic salts such as lithium or sodium phenoxide. The most preferred phenolic compounds are t-butyl phenol, t-octyl phenol and nonyl phenol.

A particularly preferred procatalyst complex is described in U.S. Pat. No. 4,981,931, to Bell, which is hereby incorporated in its entirety, by reference thereto. This patent describes a tungsten catalyst complex having the formula:

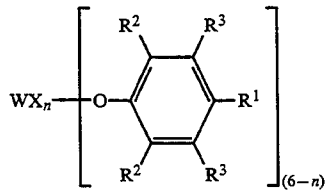

where X is Cl or Br, n is 2 or 3, $R^1$ is H, a Cl, an alkyl group having 1–10 carbons, an alkoxy group having 1 to 8 carbons, or a phenyl group; $R^2$ is H, a halogen, or an alkyl group having 1 to 9 carbon atoms; and $R^3$ is a H, or an alkyl group having 1 to 10 carbon atoms together with a tin activator compound having the formula $R_3SnH$, where R is an alkyl group having 1 to 10 carbon atoms, or a phenyl group.

The alkoxy groups $R_1$ can correspond to the following formulas:

$$-O-(CH_2)_m-CH_3, \text{ and } -O-(CH_2)_{n1}-CH\begin{matrix}(CH_2)_{n2}-CH_3\\(CH_2)_{n3}-CH_3\end{matrix},$$

wherein m is between 0 and 7, $n_1$, $n_2$, and $n_3$ are integers, equal or different, between 0 and 5, wherein the sum of the three integers is between 0 and 5 inclusive,

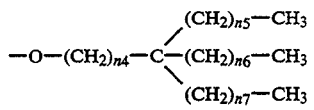

wherein the numbers $n_4$, $n_5$, $n_6$, and $n_7$ are equal or different, between 0 and 4 inclusive and the sum of the four numbers is between 0 and 4 inclusive. The bulky alkyl groups of $R_2$ can be for example isopropyl, isobutyl, tert-butyl, iso-amyl, tert-amyl or similar groups. The structure may be for example:

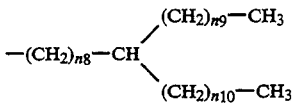

where $n_8$, $n_9$, and $n_{10}$ represent integers, equal or different between 0 and 6 with the sum of the three numbers no greater than 6. Other examples of $R_2$ may be represented by the formula:

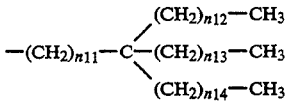

wherein $n_{11}$, $n_{12}$, $n_{13}$, and $n_{14}$ are integral numbers the sum of which is no greater than 5. The two $R^2$ groups are generally bulky but do not have to be identical. The $R^2$ be methyl groups.

U.S. Pat. No. 5,082,909, which is hereby incorporated in its entirety by reference thereto, also relates to "Bell catalysts" for the metathesis polymerization of polyolefins.

The tungsten catalyst complex can be prepared in a manner similar to the method disclosed by Bassett et al. in *The Journal of Inorganic Chemistry,* Vol. 26, No. 25, pp. 4272–4277, (1987) and European Patent Appl. EP No. 259,215, Mar. 9, 1988, both of which are hereby incorporated, in their entireties, by reference thereto. Among the tungsten catalyst complexes that may be employed in this invention are $WCl_2$(4-ethoxyphenoxy)$_4$, $WCl_2$ (4-butoxyphenoxy)$_4$, $WCl_3$ (2,6-di-tertbutylphenoxy) $_3$, $WCl_2$ (phenoxy)$_4$, $WCl_2$ (3-methylphenoxy)$_4$, $WCl_2$ (4-methylphenoxy), $WCl_2$ (3,5-dimethylphenoxy)$_4$, $WCl_2$ (4-butylphenoxy)$_4$, $WCl_2$ (4-chlorophenoxy)$_4$, $WCl_3$ (2,6-dimethylphenoxy)$_3$, $WCl_3$ (2,4,6-trimethylphenoxy)$_3$, $WCl_2$ (4-phenylphenoxy)$_4$, $WCl_2$ (4-methoxyphenoxy)$_4$, and $WCl_3$ (2,6-diisopropylphenoxy)$_3$.

When used in conjunction with a procatalyst activator (described below), the "Bell-type" procatalyst acts to delay gelation and polymerization of the metathesis-polymerizable cycloolefins, for a time sufficient to at least charge the reaction mixture to a mold. Both the Bell-type procatalyst and the procatalyst activator have good stability, with resistance to oxygen and moisture. As reported in the '931 patent, the Bell-type procatalyst and the procatalyst activator are easily isolated, without requiring the addition of a rate moderator compound to obtain the desired delay in gel and cure time.

If necessary to prevent premature polymerization of the procatalyst component/monomer solution, which could occur within a matter of hours, about 1 to 5 moles of a Lewis base or a chelating agent can be added per mole of procatalyst compound. Preferred chelatants include acetylacetones, dibenzoyl methane and alkyl acetoacetates, where the alkyl group contains from 1 to 10 carbon atoms. Preferred Lewis bases are nitriles and ethers such as benzonitrile and tetrahydrofuran. The improvement in stability and shelf-life of the procatalyst component/monomer solution is obtained regardless of whether the complexing agent is added before or after the phenolic compound. When this complexed procatalyst component is added to purified cycloolefin, for example dicyclopentadiene, it forms a solution which is stable and has a shelf-life of several months in the absence of an activator.

The molar ratio of the procatalyst to metathesis polymerizable monomer (e.g. dicyclopentadiene) in the reaction mixture is generally from about 1:500 to 1:15,000, more preferably from about 1:2000 to 1:5,000. Still more preferably, the molar ratio of the procatalyst to monomer is from about 1:1000 to 1:3000, most preferably from about 1:1500 to 1:3000.

A lower amount of procatalyst not only results in a cost savings, but also a lower amount of procatalyst in the final product. It has been found that the lower amount of procatalyst in the final product provides a polymer which has less color and is less corrosive than its non-additive containing counterpart.

Metathesis polymerization procatalyst activators include alkylaluminum compounds, alkylzinc compounds, alkyltin compounds, alkylmagnesium compounds, alkyllithium compounds, and tin hydrides. Alkylaluminum compounds, such as trialkylaluminum compounds and dialkylaluminum halides, are preferred. Particularly preferred activators include dialkylaluminum halides containing an alkyl moiety of from 1 to 12 carbon atoms and iodide as the halide. Exemplary procatalyst activators include trialkylaluminum compounds, a dialkylaluminum halide, an alkylaluminum dihalide wherein the alkyl groups contain from 1 to 12 carbon atoms, triethylaluminum, diethylaluminum chloride, ethylaluminum dichloride, ethylaluminum chloride n-propoxide, a mixture of tri-n-octylaluminum:dioctyl-aluminum iodide:diglyme, tributyltin hydride, and tetrabutyl tin. The most preferred procatalyst activator is an 85:15:100 mixture (molar basis) of tri-n-octylaluminum: dioctylaluminum iodide:diglyme, in toluene.

The procatalyst activator can be prepared by mixing, for example, an alkyl aluminum compound or mixture of alkyl aluminum compounds with a Lewis base or chelating agent at a 1:1 to 1:5 molar ratio. While either order of addition, i.e., Lewis base to alkyl aluminum compound or alkyl aluminum compound to Lewis base, can be used, it is preferred to add the Lewis base to the alkyl aluminum compound, with agitation. The reaction is highly exothermic, and it is desirable to control the rate of Lewis base addition to the alkyl aluminum compound so as to maintain the temperature at less than approximately 50° C. to prevent decomposition of the rate moderator complex. In the case of solid Lewis bases, the base can be added as the solid or dissolved in a suitable nonreactive solvent such as toluene. The activator can also be prepared by dissolving or suspending the Lewis base in the cycloolefin and adding the alkyl aluminum component. Diglyme [i.e. bis(2-methoxyethyl) ether], may also be added to the activator solution.

The procatalyst activator is readily soluble in the cycloolefin, and is preferably in solution with the metathesis polymerizable olefin, which is preferably dicyclopentadiene. The solution of procatalyst activator and dicyclopentadiene monomer is storage stable (unlike the tungsten compound/monomer solution), and therefore needs no additives to prolong its shelf life, unlike the tungsten compound/monomer solution. If, however, an unmodified activator/monomer solution is mixed with the procatalyst/monomer solution, the polymerization reaction would initiate instantaneously, and the polymer could then set up in the mixing head.

The amount of procatalyst activator to be used differs with the particular procatalyst being used. For a "standard procatalyst" (i.e., procatalysts other than Bell procatalysts), the molar ratio of Al:W is generally from about 2:1 to 4:1, and is preferably from about 2.5:1 to 3.5:1, and is most preferably from about 2.75:1 to 3.25:1. For Bell procatalysts, the molar ratio of Sn:W is generally from about 1.5:1 to 9:1, preferably from about 2:1 to 6:1, and most preferably from about 2:1 to 3:1.

The onset of gelation or viscosity build-up of metathesis polyymerizable cycloolefins can be delayed by the addition one or more reaction rate moderators.

U.S. Pat. No. 4,458,037, to Leach, which is hereby incorporated in its entirety, by reference thereto, discloses extending the gelation time to as much as ten minutes at room temperature by the use of a dialkylaluminum iodide activator moderated by di-n-butyl ether.

U.S. Pat. No. 4,882,401, to Bell, which is hereby incorporated in its entirety, by reference thereto, discloses the use of alkylzinc activators instead of the alkylaluminum compounds usually used as activators in metathesis polymerization. The alkylzinc activators also serve to significantly increase gel and cure times, and may be used used in conjunction with tungsten or molybdenum compounds to which a phenolic compound has been added.

U.S. Pat. No. 4,883,849, to Matlack, which is hereby incorporated, in its entirety, by reference thereto, discloses certain nitrogen-containing compounds which act as moderators which significantly delay the onset of gelation or viscosity build-up of metathesis polymerizable cycloolefins, at temperatures up to at least about 80° C. These compounds may be added either to the catalyst-containing feedstream or to the activator-containing feedstream, provided that the components remain stable in the presence of these compounds.

The nitrogen compounds which can be employed include anilines, N-alkylanilines, alkyl arylamines, and related compounds. These nitrogen compounds may be represented by the general formula:

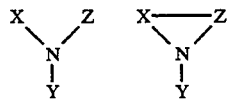

wherein X represents aryl, alkaryl or haloaryl groups, Y represents hydrogen or an alkyl group, and Z represents alkyl, aralkyl, cycloalkyl groups or hydrogen. When neither Y nor Z represents hydrogen, X, Y and Z all must represent an alkyl group. Useful compounds include aniline, N-ethylaniline, indoline, triethylamine, ethylpiperidine, and methylpiperidine.

Preferred additives include N-ethylaniline and indoline. These preferred additives have been chosen as being readily available in the commercial marketplace, and as being effective in lower concentrations, thus minimally affecting the properties of the polymer being produced.

U.S. Pat. No. 4,727,125, to Nelson, which is also hereby incorporated in its entirety, by reference thereto, discloses delaying the onset of gelation or viscosity build-up at temperatures up to at least about 80° C., by employing, as a reaction rate moderator, a sterically unhindered or partially unhindered nucleophilic Lewis base. Sterically unhindered or partially unhindered nucleophilic Lewis bases which can be employed as moderators include unsaturated cyclic amines such as, e.g., pyridine, 2-,3-,4-, or 3,4-disubstituted pyridines, 2-,2,3,-di-, or 2,5-di-substituted pyrazines, quinoline and quinoxaline and cyclic saturated polycyclic amines such as hexamethylene tetramine and 1,4-diazabicyclo[2.2.-2]octane, as well as still other nucleophilic Lewis bases including phenanthridine, pyrimidine, isoquinoline and substituted derivatives of these materials.

The sterically unhindered or partially unhindered nucleophilic Lewis bases can be employed in conjunction with conventional metathesis catalysts to polymerize any metathesis polymerizable olefin. A cycloolefin reaction mixture moderated by a sterically unhindered or partially unhindered Lewis base according to this invention remains fluid for a relatively long time at room temperature prior to forming a gel. As long a time as 1 to 4 hours can be required for gel formation at room temperature. Thus, the catalyst components need not be mixed and immediately injected into a mold. While the RIM technique can be employed, processing is not limited to the RIM technique. Moreover, the RIM technique can be used with a premixed reactive solution (i.e., cycloolefin containing both catalyst and activator) and materials can be charged directly into the heated mold without using a mix head on the molding machine.

The sterically unhindered or partially hindered moderators extend the gel time at convenient molding temperatures, i e, about 80° C. at which temperature the gel time can be extended to as long as three minutes or more. Solutions containing conventional rate moderators gel within 15 to 20 seconds at most. The extended gel time, during which the reaction mixture remains highly fluid, allows the reaction mixture to be used in techniques where molds are filled slowly, as is the situation, for example, in rotational molding, where centrifugal force is employed to distribute the mixture and where the polymerization reaction cannot start until uniform distribution is achieved. These moderators are also useful in preparing polymer articles filled with glass or other fibrous mat reinforcement where the mixture must remain fluid until it has completely impregnated the mat. Manufacture of large objects, where the volume of the mold, per se, necessitates long filling time, can also be facilitated by using these moderators.

U.S. Pat. No. 4,933,402, to Matlack, which is hereby incorporated in its entirety, by reference thereto, discloses the use of phosphorous-containing compounds as reaction rate moderators. These compounds are disclosed as delaying the onset of gelation at temperatures up to at least about 80° C. These compounds may be added either to the procatalystcontaining feedstream or to the procatalyst activatorcontaining feedstream, provided that the components remain stable in the presence of these compounds.

The phosphorus compounds suitable as moderators include trialkyl phosphites (especially tributylphosphites), norbornene phosphites, norbornene phosphates, trialkyl phosphates, triaryl phosphates, and related compounds. Phosphorus compounds suitable as moderators include those represented by the general formula:

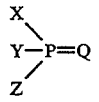

wherein X, Y and Z represent alkyl, cycloalkyl, alicyclic, aryl, aralkyl, alkaryl, alkoxy, alkylthio, aryloxy, arylthio, halogen or thiophene groups. X and Y may form a ring in which the phosphorus atom is included which is alicyclic, benzo or benzoalicyclic or X, Y and Z may form two rings which includes the phosphorus atom. Q represents oxygen, sulfur or nothing. Useful compounds include trimethyl phosphite, tris(2-chloroethyl)phosphite, ethyl dichlorophosphite, triisopropylphosphite, triisobutylphosphite, diethyl chlorophosphite, triethyl phosphite, isooctyldiphenyl phosphite, triisooctylphosphite, tris(5-norbornenyl-2-methyl)phosphate, triethyl phosphate, tributylphosphate, triphenylphosphate, tricresylphosphate, butylated triphenyl phosphate, diethylphenyl phosphonite, diisopropyl phenylphosphonite, ethyl diphenylphosphonite, tetraethyl pyrophosphite, 1,2-phenylenephosphorochloridite, ethylene chlorophosphite, diethyl ethylenepyrophosphite, diisodecylpentaerythritol diphosphite, tripentyl phosphite, trihexylphosphite, triheptylphosphite, trineodecylphosphite, tridodecyl trithiophosphite, tributylphosphine, triphenylphosphine, and tris(5-norbornenyl-2-methyl)phosphite.

Preferred additives include tris(5-norbornenyl-2-methyl)phosphite, tris(5-norbornenyl-2-methyl)phosphate, trimethyl phosphite, trialkyl phosphites, tributyl phosphate, trialkyl phosphates, trineodecyl phosphite, diethyl phenyl phosphonite, and diisodecylpentaerythritol diphosphite.

These preferred additives are readily available in the commercial marketplace, and are effective in relatively low concentrations, and thereby minimally affect the properties of the polymer being produced. Cycloolefin reaction mixtures moderated by phosphorus containing compounds remain fluid for a relatively long time at room temperature prior to forming a gel. By varying the amount of moderator, procatalyst, and procatalyst activator, it is possible to delay the gel time over a wide time period. Thus, the catalyst components need not be mixed and immediately injected into a mold. While the RIM technique can be employed, processing is not limited to the RIM technique. Moreover, the RIM technique can be used with a premixed reactive solution (i.e. cycloolefin containing both catalyst and activator) and materials can be charged directly into the heated mold without using a mix head on the molding machine.

Reaction rate moderators are generally used in conjunction with aluminum alkyl and tin alkyl-activated metathesis catalyst systems. If an alkylaluminum procatalyst activator is used, the onset of polymerization can be delayed by adding a reaction rate moderator selected from the group consisting of ethers, esters, ketones and nitriles. Ethyl benzoate and butyl ether are preferred. Particularly preferred is the dimethyl ether of diethylene glycol (diglyme), and butyl diglyme.

In general, the moderator can be used in an amount within the range of from about 0.1 moles of moderator per mole of tungsten, up to 5 mole percent, based on total metathesis polymerizable monomer content of the reaction mixture. Preferably the moderator is used in an amount of from about 0.5–2 mole percent based on the total metathesis polymerizable monomer content of the reaction mixture. Amine-containing moderators are preferably used in an amount of about 0.5 mole amine moderator per mole of tungsten compound. Phosphorus-containing moderators are preferably used in an amount of from about 1–2 moles phosphorus compound per mole tungsten compound. A preferred ratio of the "standard" procatalyst activator (e.g. an alkylaluminum compound) to moderator is from about 1:1.5 to about 1:5, on a molar basis.

In the instance in which a Lewis Acid catalyst and a Lewis Acid cocatalyst are used, most of the oxygen or nitrogen compound (i.e. the moderator) is tied up with the Lewis acid. In this instance, it is most preferred that the moderator is present in a 1:1 molar ratio with the sum of the amount of metathesis polymerization procatalyst (e.g. $WOCl_6$) and Lewis acid catalyst (e.g. $BF_3$). If boron trifluoride is used as the Lewis Acid catalyst, it is preferred to use a dialkylaniline moderator, instead of an alkylaniline moderator. If a Lewis Acid catlayst is not present, it is most preferred that the moderator is present in a molar ratio of from about 1:1 to 2:1, with the metathesis polymerization procatalyst.

In general, the Lewis acid catalysts suitable for use in the present invention include all compounds which act as Lewis Acids, other than compounds and complexes which serve as metathesis polymerization procatalysts. Lewis Acid catalysts include metal halides (other than metal halides which act as metathesis polymerization procatalysts). Such metal halides include boron halides, tin halides, aluminum halides, titanium halides, antimony halides, bismuth halides, iron halides, zinc halides, and zirconium halides. A group of preferred Lewis acids includes boron trifluoride etherate, boron trifluoride-N,N-diethylaniline, boron trifluoride-tetrahydrofuran, tin (IV) chloride, tin (IV) bromide, boron trifluoride quinuclidine, and a polymeric Lewis acid, a protonic acid, a cation generator, and ionizing radiation. Still more preferably, the Lewis acid comprises at least one member selected from the group consisting of boron trifluoride etherate, tin (IV) bromide and tin (IV) chloride. The most preferred Lewis acid catalyst is boron trifluoride etherate. Many other Lewis acid catalysts are known, and/or can be envisioned by those of ordinary skill in this art.

The Lewis acid catalyst is generally added in an amount of from about 0.1 to 5 weight percent, preferably from about 0.25 to 2 weight percent, and most preferably from about 0.5 to 1 weight percent, based on weight of monomer polymerizable with a Lewis Acid catalyst.

The Lewis acid catalyst can be added as such or can be formed in situ, for example, by adding the Lewis acid catalyst in the form of a complex that will subsequently decompose. The Lewis acid catalyst can be added to a solution comprising the metathesis polymerizable olefin and the procatalyst (e.g. a solution of the procatalyst in dicyclopentadiene). As disclosed above, most preferably from about 1 to about 5 moles of a Lewis base or a chelating agent are added to the dicyclopentadiene/procatalyst solution per mole of procatalyst, in order to prevent premature polymerization. The amount of Lewis base or chelating agent present is not sufficient, however, to prevent polymerization of the dicyclopentadiene in the presence of the Lewis acid catalyst, if they are left in contact for more than 24 hours. Thus, it may be found desirable to add the Lewis acid catalyst to the mixing head as a separate reactant stream. Regardless of the length of the time of contact of the Lewis acid catalyst with the metathesis polymerizable olefin monomer, the Lewis acid catalyst is preferably dissolved in the monomer before addition to the reaction mixture.

The Lewis acid cocatalyst may in general be any alkyl halide and/or aryl halide. The alkyl halide may be a primary, secondary, and/or tertiary alkyl halide. A preferred group of Lewis acid cocatalysts includes isobutyl chloride, tert-butyl chloride, benzyl chloride (i.e., α-chlorotoluene), vinylbenzyl chloride, 1-bromodecane, 2-ethylhexyl chloride, 2-ethylhexyl bromide, t-butyl acetate, chlorodiphenylmethane, and polymeric chlorides, such as poly(chloroprene) and poly(vinylbenzyl chloride). This listing of preferred Lewis acid cocatalysts is merely for purposes of illustrating the large group of compounds and polymers which may serve this function, and is in no way intended to restrict the choice of the Lewis acid cocatalyst in the present invention. However, the most preferred Lewis acid cocatalysts are t-butyl chloride and isobutyl chloride.

The Lewis acid cocatalyst may, in general, be used in the process of the present invention in an amount of from about 0.05 weight percent to 5 weight percent, based on weight of monomer polymerizable with a Lewis acid catalyst. Preferably the Lewis acid cocatalyst is present in the reaction mixture in an amount of from about 0.2 weight percent to 2 weight percent. Most preferably the Lewis acid cocatalyst is present in the reaction mixture in an amount of about 0.25 to 0.5 weight percent.

The anionic polymerization catalysts include any compounds or complexes capable of catalyzing the anionic polymerization of any one or more of a variety of cationically-polymerizable monomers, so long as the anionic polymerization catalyst is compatible with the metathesis procatalyst and procatalyst activator. Compatible anionic catalysts do not have hydroxy groups which interfere with the function of the aluminum alkyl metathesis procatalyst activator. Suitable anionic polymerization catalysts include metal alkyls such as n-butyllithium and dibutylzinc. Many other suitable anionic polymerization catalysts are known to those of skill in the art of anionic polymerization.

The anionic polymerization catalyst should be present in the stream comprising the metathesis polymerization procatalyst activator, or in a separate stream, but in any event should not be present in the stream comprising the metathesis polymerization procatalyst. In general, the anionic polymerization catalyst can be present in an amount of from about 0.05 to 10 weight percent, based on the weight of the anionic polymerizable monomer. Preferably the anionic polymerization catalyst is present in an amount of from about 0.1 to 5 weight percent, most preferably 0.3 to 2 weight percent.

The free radical polymerization initiators include any compounds, complexes, or other means (such as ionizing radiation) capable of catalyzing free radical polymerization of any one or more of a variety of monomers, while also being compatible with the metathesis procatalyst and procatalyst activator system. Compatible free radical polymerization initiators will not interfere with the functioning of the metathesis polymerization procatalyst activator. Suitable free radical polymerization initiators include a wide variety of azo and peroxide compounds. Such compounds include: 2,2'-azobis(2-methylpropionitrile); dimethyl 2,2'-azobisisobutyrate; 2,2'-azobis(2-methylbutyronitrile); tertbutylperoxyoctoate; 1,1'-azobis(cyclohexanecarbonitrile); 1,1-bis(tert-butylperoxy)-3,3,5-trimethylcyclohexane; 2,2'-azobis(2,4,4-trimethylpentane); dicumyl peroxide; 2,5-di(tert-butylperoxy)-2,5-dimethylhexane; tert-butylperoxide. Free-radical initiation by ultraviolet light or electron beam or gamma rays may also be utilized. If ultraviolet light is used, a photoinitiator should also be used.

The azo or peroxy compounds or photoinitiators, which act as free-radical initiators, can be used in a stream comprising a metathesis polymerizable olefin together with the metathesis procatalyst, or in a stream comprising a metathesis polymerizable olefin together with the metathesis procatalyst activator, or in a separate stream. The amount of azo or peroxy compound could be from about 0.05 to 10 percent, based on the weight of the free-radical polymerizable monomer. Preferably the amount of azo or peroxy compound is from 0.25 to 5 weight percent, most preferably from about 0.5 to 2 weight percent, based on the weight of the free radical polymerizable monomer.

U.S. Pat. No. 4,900,779, which is hereby incorporated in its entirety by reference thereto, describes the use of hydrosilation catalysts for making organosilicon polymers. The organosilicon polymers comprise alternating polycyclic hydrocarbon residues, and residues of monomers comprising at least one hydrosilane group, i.e., cyclic polysiloxane or tetrahedral siloxysilane residues linked through carbon-silicon bonds. The cyclic polysiloxane or tetrahedral siloxysilane monomers contain at least two hydrosilane groups. The ratio of carbon-carbon double bonds in the ringls of the polycyclic polyene to hydrosilane groups in the cyclic polysiloxane or tetrahedral siloxysilane monomers is in the range of from about 0.5:1 up to about 1.8:1. The polycyclic polyene and/or the cyclic polysiloxane or tetrahedral siloxysilane has more than two reactive sites (i.e., carboncarbon double bonds of the rings of the polycyclic polyene or hydrosilane groups in the cyclic polysiloxane or tetrahedral siloxysilane).

Any cyclic polysiloxane, tetrahedral siloxysilane, or linear polysiloxane containing two or more hydrogen atoms bound to silicon will enter into the reaction. Cyclic polysiloxanes useful in forming the products of this invention have the general formula:

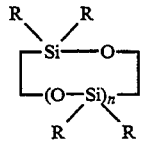

I wherein R is hydrogen, a saturated, substituted or unsubstituted alkyl or alkoxy radical, a substituted or unsubstituted aromatic or aryloxy radical, n is an integer from 3 to about 20, and R is hydrogen on at least two of the silicon atoms.

The tetrahedral siloxysilanes are represented by the general structural formula:

II

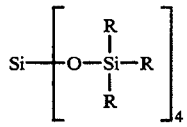

wherein R is as defined above and is hydrogen in at least two silicon atoms in the molecule.

Examples of reactants of Formula (I) include, e.g., trimethyl cyclotrisiloxane, tetramethyl cyclotetrasiloxane, pentamethyl cyclopentasiloxane, hexamethyl cyclohexasiloxane, tetraethylcyclotetrasiloxane, cyclotetrasiloxane, tetraphenyl cyclotetrasiloxane, tetraoctyl cyclotetrasiloxane and hexamethyl tetracyclosiloxane.

The most commonly occurring members of this group are the tetra-, penta-, and hexacyclosiloxanes, with tetramethyl tetracyclosiloxane being a preferred member. In most cases, however, the material is a mixture of a number of species wherein n can vary widely. Generally, commercial mixtures contain up to about 20% (in purer forms as low as 2%) low molecular weight linear methylhydrosiloxanes, such as heptamethyltrisiloxane, octamethyltrisiloxane, etc.

Examples of reactants of Formula (II) include, e.g., tetrakisdimethylsiloxysilane, tetrakisdiphenylsiloxysilane, and tetrakisdiethylsiloxysilane. The tetrakisdimethylsiloxysilane is the best known and preferred species in this group.

Cyclic polyenes which can be employed are polycyclic hydrocarbon compounds having at least two nonaromatic carboncarbon double bonds in their rings. Exemplary compounds include dicyclopentadiene, methyl dicyclopentadiene, cyclopentadiene oligomers, norbornadiene, norbornadiene dimer, hexahydronaphthalene, dimethanohexahydronaphthalene, and substituted derivatives of any of these.

If prepolymers are being formed (see discussion below), cyclic polysiloxanes with three or more hydrogen atoms bound to silicon are generally used. Mixtures of cyclic polysiloxanes are also useful. Cyclic polysiloxanes useful in fcrming the products of this invention include those having the general formula I (above), wherein R is hydrogen, or substituted or unsubstituted alkyl or aromatic radical, n is an integer from 3 to about 7, and R is hydrogen on at least three of the silicon atoms in the molecule.

Examples of cyclic polysiloxanes suitable for the formation of prepolymers include, e.g., tetra and pentamethylcyclotetrasiloxanes, tetra-, penta-, hexa- and heptamethylcyclopentasiloxanes, tetra-, penta- and hexamethylcyclohexasiloxanes, tetraethyl cyclotetrasiloxanes and tetraphenyl cyclotetrasiloxanes. Preferred are 1,3,5,7-tetramethylcyclotetrasiloxane, 1,3,5,7,9-pentamethylcyclopentasiloxane and 1,3,5,7,9,11-hexamethylcyclohexasiloxane, or blends thereof.

U.S. Pat. No. 4,877,820, which is hereby incorporated in its entirety by reference thereto, relates to crosslinked organosiloxane polymers, preferably poly(organohydrosiloxane) of the general formula:

III

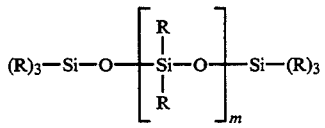

wherein R is a substituted or unsubstituted, saturated alkyl radical or a substituted or unsubstituted phenyl radical, and about 1% to about 50%, preferably 5 to about 50%, of the R's are hydrogen, and m is an integer from about 5 to 1000, preferably 5 to 100, and the maximum value of m is desirably 40. A preferred linear poly(organohydrosiloxane) defined by the above general formula is trimethylsiloxy-terminated methylhydropolysiloxane.

Other exemplary poly(organohydrosiloxanes) include: trimethylsiloxy-terminated dimethylsiloxane-methylhydrosiloxane copolymer, dimethylsiloxy-terminated dimethylsiloxane methylhydrosiloxane copolymer, dimethylsiloxy-terminated polydimethylsiloxane, trimethylsiloxy-terminated methyloctylsiloxane methylhydrosiloxane copolymer, dimethylsiloxy-terminated phenylmethylsiloxane methylhydrosiloxane copolymer, trimethylsiloxy-terminated methylcyanopropylsiloxane methylhydrosiloxane copolymer, trimethylsiloxy-terminated 3,3,3-trifluoropropylmethyl siloxane methylhydrosiloxane copolymer, trimethylsiloxy-terminated 3-aminopropylmethylsiloxane methylhydrosiloxane copolymer, trimethylsiloxy-terminated 2-phenylethylmethylsiloxane methylhydrosiloxane copolymer, and trimethylsiloxy-terminated 2-(4-methylphenyl) ethylmethylsiloxane-methylhydrosiloxane copolymer.

The hydrosilation reaction proceeds readily in the presence of a platinum-containing catlayst. Metal salts and complexes of Group VIII elements can also be used. The preferred catalyst, in terms of both reactivity and cost, is chloroplatinic acid ($H_2PtCl_6.6H_2O$). Catalyst concentrations of 0.0005 to about 0.5% by weight, based on weight of the monomer, will effect smooth and substantially complete polymerization. Typical platinum concentrations are from about 0,001 to about 0.05 weight percent, preferably about 0.0025 to 0.03 weight percent, based on weight of the prepolymer. Other platinum compounds can also be used to advantage in some instances, such as $PtCl_2$ and dibenzonitrile platinum dichloride. Platinum on carbon is also effective for carrying out high temperature polymerizations. Other useful platinum catalysts are disclosed in, e.g., U.S. Pat. Nos. 3,220,972, 3,715,334, and 3,159,662, each of which is hereby incorporated in its entirety, by reference thereto. An exhaustive discussion of the catalysis of hydrosilation can be found in Advances in Organometallic Chemistry, Vol. 17, which is also incorporated in its entirety, by reference thereto. See especially page 407, et. seq. The polymerization reactions can be promoted thermally or by the addition of radical generators such as peroxides and azo compounds.

U.S. Pat. No. 4,902,731, which is hereby incorporated in its entirety, by reference thereto, relates to organosilicon prepolymers. These heat-curable prepolymers or oligomers are the partial reaction product of (a) a cyclic polysiloxane or a tetrahedral siloxysilane containing at least two hydrosilane groups and (b) a polycyclic polyene having at least two chemically distinguishable carbon-carbon double bonds, wherein the ratio of the carbon-carbon double bonds in the rings of (b) to hydrosilane groups in (a) is greater than 0.5:1 and up to 1.9:1 and at least one of the compounds (a) and (b) has more than two reactive sites.

The reactions for forming the prepolymers can be promoted thermally or by the addition of a hydrosilation catalyst, radical generators such as peroxides, and azo compounds, as described above. Hydrosilation catalysts include metal salts and complexes of Group VIII elements. The preferred hydrosilation catalysts contain the same platinum-containing catalysts described above with respect to hydrosilation polymers.

In one embodiment for preparing a prepolymer, a platinum-containing catalyst, preferably chloroplatinic acid, and a liquid polycyclic polyene are mixed and heated at 40° to 80° C. for one to two hours to form a platinum/olefin complex. The platinum/olefin complex solution is cooled to room temperature and then mixed with the other ingredients, i.e., cyclic siloxane, polycyclic polyene, chain extender, aliphatic hydrocarbon solvent and optional ingredients. This mixture is stirred at 20° C. to 40° C. in a water bath which serves as a heat sink. The level of solvent (from 5 to 50% by weight of the prepolymer solution), the catalyst level, and the temperature of the bath will all affect the rate of reaction. Conditions should be chosen such that the reaction temperature does not increase substantially above the bath temperature, as a sudden temperature rise may decrease the activity of the catalyst, which is needed for cure.

In a second embodiment, the polycyclic polyene-platinum catalyst complex can be mixed with solvent, polycyclic polyene, chain extender and optional ingredients. The mixture is heated to a temperature at which hydrosilation of reactive double bonds is facile, usually 40° to 80° C. Then, the cyclic siloxane is slowly dripped into the mixture.

Organosilicon prepolymers can also be made by heating siloxane and polyene reactants at lower temperatures, e.g., about 50° to about 80° C. The resulting prepolymer may be in the form of a solid or a flowable, heat-curable liquid, even though the ratio of carbon-carbon double bonds to hydrosilane groups is otherwise suitable for cross-linking. Such prepolymers can be recovered and subsequently transferred to a mold for curing, to form thermoset polymers. Temperatures of, for example, from about 100° to about 250° C., are utilized for curing such prepolymers.

U.S. Pat. No. 5,008,360, which is hereby incorporated in its entirety, by reference thereto, is directed to organosilicon materials which are prepregs comprising fiber reinforcement impregnated with the partial hydrosilation reaction product of a polyene, a polycyclic polyene, and at least one cyclic polysiloxane containing three or more ≡SiH groups.

The method of the present invention can be carried out by providing a plurality of reactant streams, wherein a first reactant stream comprises the metathesis polymerization procatalyst activator and a portion of the metathesis polymerizable olefin, and a second reactant stream comprises the metathesis polymerization procatalyst and a portion of the the metathesis polymerizable olefin. At least one reactant stream further comprises at least one member selected from the group consisting of: (i) a Lewis acid catalyst and a Lewis acid cocatalyst, present in separate reactant streams; (ii) an anionic polymerization catalyst; (iii) a free radical polymerization initiator; (iv) a hydrosilation polymerization catalyst. The reactant streams are then mixed together, whereby a reaction mixture is formed. The reaction mixture is then formed into a desired shape before the polymerization of the metathesis polymerizable olefin.

Reaction Injection Molding (RIM) is the preferred process for carrying out the method of the present invention. RIM is most conveniently accomplished by mixing equal parts of two solutions, one of which contains twice the desired concentration of procatalyst, and the other of which contains twice the desired concentration of the procatalyst activator. It is preferable, but not necessarily required, that at least one of the solutions contains a rate moderator, as described above. Since the reactive mixture does not gel immediately, the RIM process can frequently be carried out via the alternative process of adding one part of the catalyst system (i.e. either the procatalyst or the procatalyst activator) to substantially all of the cycloolefin and, just prior to the polymerization and molding, mixing in a concentrate of the other part.

Poly(dicyclopentadiene) can be produced via a RIM process, to result in a polymeric product having a desired form. The procatalyst and the procatalyst activator are each mixed with dicyclcopentadiene to form solutions that are placed in separate vessels. These containers provide the source for two separate reactant streams, with each container provided with a solution of the cycloolefin monomer or monomers. The two reactant streams are combined in the RIM machine's mixing head and then injected into a warm mold where they quickly polymerize into a solid, infusible mass. The reaction mixture is preferably allowed to polymerize to a degree of substantial reaction termination while the reaction mixture is within the mold, whereby a molded article is produced, followed by removing the molded article from the mold. Similar methods can be utilized for RIM processes utilizing other metathesis polymerizable olefins.

The method of the invention is not intended to be limited to systems employing two reactant streams, each containing monomer. In fact, in practicing the instant invention it may be preferable, under certain conditions, to add, for example, a cationic initiator as a third reactant stream. In general, the invention is carried out using two to four reactant streams. Preferably, however, only two reactant streams are utilized in the process. The first reactant stream preferably comprises dicyclopentadiene monomer, the metathesis polymerization procatalyst, and the Lewis acid catalyst, while the second stream preferably comprises dicyclopentadiene monomer, the metathesis polymerization procatalyst activator, and the Lewis acid cocatalyst. However, if enough of the delay additive (i.e. moderator, as discussed above) is used, a one-stream system can be used in a RIM process.

The composition of the present invention preferably comprises a low level of residual metathesis polymerizable olefin monomer, regardless of the particular combination of catalysts present in the composition. Preferably the composition has a residual methathesis polymerizable olefin monomer level of from about 0 to 0.25 weight percent, based on the weight of the polyolefin. Still more preferably, the level of residual metathesis polymerizable olefin monomer is from about 0 to 0.15 weight percent, based on the weight of the polyolefin.

If the olefin monomer is dicyclopentadiene, as is preferred, obtaining a low residual dicyclopentadiene monomer level is a major objective of the present invention. A low level of residual dicyclopentadiene monomer enables the production of molded articles comprising polydicyclopentadiene suitable for indoor use, if the odor level from the monomer is reduced to a very low level.

As referred to herein, the "amount" of residual monomer in the composition of the present invention is an amount present immediately upon completion of the polymerization reaction, i.e., immediately upon removing the molded product from the mold.

Various additives can be included to modify the properties of polyolefin. Possible additives include fillers and reinforcing agents, pigments, antioxidants, light stabilizers and polymeric modifiers such as elastomers, among others. U.S. Patent 4,689,380, U.S. Patent No. 4,400,340, and U.S. Patent No. 4,436,858 (each of which is incorporated, in its entirety, by reference thereto), disclose various additives for a variety of different purposes.

Because of the rapid polymerization time, the additives must be incorporated before the polyolefin sets up in the mold. It is often desirable that the additives be combined with one or both of the catalyst system's streams before being injected into the mold. Fillers can also be charged to the mold cavity, prior to charging the reaction streams, if the fillers are such that the reaction stream can readily flow around them to fill the remaining void space in the mold. However, it is essential that the additives do not adversely affect the catalytic activity of the various catalyst components.

Light stabilizers which are useful in the composition of the present invention comprise hindered amines such as 1-octyl-2,2,6,6-tetramethylpiperidine (available from Ciba-Geigy, under the name Tinuvin ® 123), as well as carbon black and other pigments which can serve as light stabilizers. Light stabilizers comprising —NH groups therein are not recommended, because at least some of such compounds interfere with the catalyst system.

Reinforcing agents and fillers can increase the polymer's flexural modulus with only a small sacrifice in impact resistance. Such reinforcing agents/fillers include glass, wollastonite, mica, carbon black, talc, and calcium carbonate. It is surprising that in spite of the highly polar nature of their surfaces, these materials can be added without appreciably affecting the polymerization rate. From about 5% to 75% by weight may be incorporated, based on the weight of the final product. The addition of the materials having modified surface properties is particularly advantageous. The exact amount is easily determinable by one skilled in the art and depends on the preferences of the practitioner. The addition of these materials also serves to decrease the mold shrinkage of the product.

Since poly(dicyclopentadiene) contains some unsaturation it may be subject to oxidation. The product can be protected from oxidation by the incorporation of as much as about 5 weight percent of at least one antioxidant selected from the group consisting of phenolic antioxidants and amine antioxidants, and mixtures of these antioxidants. Preferred antioxidants include 2,6-tert-butyl-p-cresol, N,N'-diphenyl-p-phenylenediamine and tetrakis[methylene(3,5-di-t-butyl-4-hydroxycinnamate)]-methane. While the antioxidant can be added to either or both reactant streams, incorporation into the activator/monomer reactant streams is preferred.

The addition of an elastomer can increase the impact strength of the polymer with only a slight decrease in flexural modulus. The elastomer can be dissolved in one or all of the reactant streams. The amount of elastomer used is determined by its molecular weight and by the initial viscosity of the reactant streams to which it is added. Amounts within the range of 1% to 10% by weight and preferably 3% to 10% by weight, based on the weight of the total stream, can be used without causing an excessive increase in solution viscosity. An example of preferred elastomer is styrenebutadiene rubber, made by solution polymerization.

The reactant streams cannot be so viscous that adequate mixing of the reactant streams is not possible. However, increasing the viscosity to between 300 cps and 1,000 cps improves the mold filling characteristics of the combined reactant streams. The elastomer is preferably added to all of the reactant streams so that the viscosities of the two reactant streams are similar. When the reactant streams have similar viscosities, more uniform mixing is obtained when the reactant streams are combined. An increase in viscosity also reduces leakage from the mold and simplifies the use of fillers by decreasing the settling rate of solid filler materials. Useful elastomers can be unsaturated hydrocarbon elastomers such as, e.g., styrene-butadiene rubber, polyisoprene, polybutadiene, natural rubber, styrene-isoprenestyrene triblock rubber, styrene-butadiene-styrene triblock rubber, and ethylene-propylene-diene terpolymers, or saturated elastomers such as polyisobutylene and ethylene-propylene copolymers.

Preparation of Catalysts Utilized in Examples

The invention is illustrated by the Examples reported in Tables 1–5, below. In these Examples, a "standard catalyst" component is prepared by suspending a $WCl_6$ complex in toluene, reacting it with tert-butyl alcohol (so that $WOCl_4$ is formed as an intermediate), and thereafter adding nonylphenol (resulting in replacement of one or more chlorines by a nonylphenol group) to solubilize catalyst, followed by adding 2,4-pentanedione (resulting in the replacement of one or more additional chlorines, with 2,4-pentanedione), to result in a desired catalyst complex. This product is then diluted to a 0.5 molar concentration by adding sufficient additional toluene. A 1.0 molar toluene solution of an 85:15:100 mixture of tri-n-octyl aluminum: dioctylaluminum iodide:diglyme is prepared. Diglyme is also known as 2-methoxyethyl ether. For a trial with 5 ml dicyclopentadiene, the standard 0.04 ml of 0.5 molar catalyst in toluene plus one equivalent of dichlorodiphenylmethane per W is 0.045 ml (0.02 mmole W), for a monomer to catalyst molar ratio of 2000 to 1. The standard amount of 1.0 M activator is 0.06 ml (0.06 mmole Al).

A "Bell catalyst" [i.e., $WOCl_2$ (O-2,6-diisopropylphenyl)$_2$] is made by contacting tungsten oxytetrachloride (i.e., $WOCl_4$) with two equivalents of 2,6-diisopropylphenol in a hydrocarbon solvent. The $WOCl_2$ (O-2,6-diisopropylphenyl)$_2$, a solid, is used as 0.045 ml 0.4 M solution in dicyclopentadiene (0.018 mmole W) with no added dichlorodiphenylmethane. It is activated by 0.015 ml tributyltin hydride in 0.015 ml toluene (0.056 mmole Sn), 0.22 ml 1.0 M ethylaluminum dichloride in hexane (0.22 mmole Al), 0.11 ml 1.0 M di-n-butylzinc in toluene (0.11 mmole Zn), 0.03 ml 1.6 M n-butyllithium in hexane (0.048m mole Li), or 0.15 ml 0.7 M di-n-butylmagnesium in heptane (0.015 mmole Mg), except as indicated otherwise in Tables 1–5, below. Ethylaluminum chloride n-propoxide is used as 0.11 ml of 0.5 M solution in toluene (0.055 mmole Al). Thus, the molar ratio for the standard catalyst system is 3 Al/W and for the Bell catalyst 3.1 Sn/W, 12 Al/W for ethylaluminum dichloride, 3 Al/W for ethylaluminum chloride n-propoxide, 6 Zn/W, 6 Mg/W, and 6 Li/W.

The dicyclopentadiene utilized in the preparation of the catalysts and elsewhere in the Examples is a commercially available dicyclopentadiene having a purity level in excess of 98% by weight.

A general description of how the various runs are performed is provided below, for each of the catalyst types utilized, i.e., for the "standard catalyst" (a tungsten hexachloride-based catalyst) as well as for the "Bell Catalyst" (a tungsten oxychloride-based catalyst).

Standard Polymerization Using Standard Catalyst 5 ml of dicyclopentadiene are charged to a nitrogen-sparged vessel. Then 0.04 ml of the 0.5 M tungsten catalyst component solution is injected and mixed well. [In the event that dichlorodiphenylmethane is used in a 1:1 molar ratio with the tungsten catalyst, the dichlorodiphenylmethane is included in the catalyst solution, of which 0.045 ml is then used, instead of the usual 0.04 ml.]Then 0.06 ml of the standard 1.0 M activator prepared above is added, and the mass mixed well. The vessel is then immersed in a constant temperature bath maintained at 32° C., or at some other temperature, as indicated in the individual examples. The Lewis acid catalyst is then mixed with the tungsten catalyst, before the activator is added. The Lewis acid cocatalyst is then added. Otherwise the order of addition is standard catalyst first, Lewis acid second, activator third, followed by Lewis acid cocatalyst.

The time from addition of the tungsten catalyst component until formation of a non-fluid gel is noted, and recorded as the "gel time". Similarly, the time from addition of the catalyst until the temperature reaches 100° C. (or 160° C., in the case of runs started at 80° C.), is recorded as the "cure time". The difference between the starting temperature and the maximum temperatures is recorded as the "▲T". The thermocouple used to measure the temperatures is rotated during the polymerization (when above 100° C.) so as to break the seal with the polymer plug, then removed before it becomes "frozen" in place. For the control examples, these values are recorded in Table I. It typically takes three seconds to gel and 30 seconds to reach 100° C., for the higher purity dicyclopentadiene monomer.

Standard Polymerization Using Bell Catalyst

A nitrogen-sparged vessel is charged with 5 ml. of dicyclopentadiene. Then 0.045 ml of a 0.4 M Bell catalyst component solution is injected into the vessel, and mixed well therein. Then 0.03 ml. of the standard 1.86 M tributyltin hydride activator, prepared above, is added to the vessel, and the contents mixed well.

The vessel is immersed in a constant temperature bath maintained at 32° C., or at another temperature, as indicated in the individual examples. The Lewis acid catalyst is mixed with the Bell catalyst before the activator is added. The Lewis acid cocatalyst is then added. Otherwise the order of addition is Bell catalyst first, Lewis acid catalyst second, activator third, followed by addition of the Lewis acid cocatalyst.

The time from addition of the Bell catalyst component until formation of a non-fluid gel is noted and recorded as the gel time. Similarly, the time from addition of the catalyst until the temperature reaches 100° C. (or 160° C., in the case of runs started at 80° C.) is noted and recorded as the cure time. The difference between the starting and maximum temperatures is noted and recorded as the ▲ T. The thermocouple used to measure temperature is rotated during the polymerization (when above 100° C.) so as to break the seal with the polymer plug, and is then removed before it becomes "frozen" in place. Examples of the metathesis-cationic polymerization of dicyclopentadiene are recorded in Table I, i.e. wherein the catalysts include metathesis polymerization procatalyst, metathesis polymerization procatalyst activator, Lewis acid catalyst, and Lewis acid cocatalyst. The polymerization of high purity dicyclopentadiene typically requires about three seconds to gel, and 30 seconds to reach 100° C.

TABLE 1

Metathesis - Cationic Polymerization of Dicyclopentadiene

Std. activator used at 2000 monomer per W, with one dichlorodiphenylmethane per W in the catalyst.
Bell means $WOCl_2$ (0-2,6-diisopropylphenyl)$_2$ used at the same level. The order of addition to the monomer was from left to right across the table.
2X means double the usual amount.

| Example Number | Metathesis Catalyst | Lewis Acid Weight % | Moderator for Lewis Acid Weight % | Activator | Co-Catalyst for Lewis Acid Weight % | Initial Temp. C.° | Seconds to Gel | Seconds to 100° C. | Maximum Temp. °C. | % Residual Monomer | Glass Transition Temp. °C. | Notes |
|---|---|---|---|---|---|---|---|---|---|---|---|---|
| 1 (comparative) | std. | none | none | std. | none | 33 | 3 | 29 | 205 | — | — | — |
| 2 (comparative) | std. | none | none | std. | 1 isobutyl chloride | 33 | 1–2 | 39 | 204 | — | — | — |
| 3 (comparative) | std. | none | none | std. | 0.5 isobutyl chloride | 32 | 2 | 32 | 200 | 0.55 | 134 | Activator and isobutyl chloride combined before addition. |
| 4 (comparative) | std. | none | none | std. | none | 33 | 3 | 28 | 203 | 1.73 | 128 | No dichlorodiphenylmethane. |
| 5 (comparative) | std. | none | none | std. | none | 33 | 3 | 28 | 207 | 0.46 | 144 | — |
| 6 (comparative) | std. | none | none | std. | 0.25 tert-butyl chloride | 32 | 3 | 29 | 204 | 0.53 | 122 | No dichlorodiphenylmethane. |
| 7 (comparative) | std. | none | none | std. | 0.25 tert-butyl chloride | 31 | 7 | 33 | 205 | 0.19 | 137 | — |
| 8 (comparative) | std. | none | none | std. | none | 31 | 5 | 30 | 205 | 0.41 | — | — |
| 9 (comparative) | std. | none | none | std. | 0.5 isobutyl chloride | 32 | 6–7 | 30 | 208 | — | — | — |
| 10 (comparative) | Bell | none | 0.2 diglyme | tributyltin hydride | none | 32 | instant | 17 | 160 | 0.83 | — | — |
| 11 (comparative) | std. | none | none | std. | none | 31 | 3 | 29 | 214 | 0.52 | 139 | — |
| 12 (comparative) | std. | none | none | std. | 0.5 tert-butyl chloride | 30 | 3 | 30 | 209 | 0.16 | — | — |
| 13 (comparative) | std. | none | none | std. | 0.5 isobutyl chloride | 29 | 1 | 50 | 191 | 0.42 | — | A duplicate run contained 0.59 $Cp_2$. |
| 14 (comparative) | std. | none | none | std. | none | 31 | 3 | 34 | 194 | 1.56 | — | — |
| 15 (compar- | std. | none | none | std. | none | 32 | 3 | 24 | 214 | 0.43 | 132 | — |

TABLE 1-continued

Metathesis - Cationic Polymerization of Dicyclopentadiene

Std. activator used at 2000 monomer per W, with one dichlorodiphenylmethane per W in the catalyst.
Bell means $WOCl_2$ (0-2,6-diisopropylphenyl)$_2$ used at the same level. The order of addition to the monomer was from left to right across the table.
2X means double the usual amount.

| Example Number | Metathesis Catalyst | Lewis Acid Weight % | Moderator for Lewis Acid Weight % | Activator | Co-Catalyst for Lewis Acid Weight % | Initial Temp. C.° | Seconds to Gel | Seconds to 100° C. | Maximum Temp. °C. | % Residual Monomer | Glass Transition Temp. °C. | Notes |
|---|---|---|---|---|---|---|---|---|---|---|---|---|
| ative) | | | | | | | | | | | | |
| 16 (comparative) | Bell | none | none | ethyl-aluminum chloride-n-propoxide | none | 32 | 5 | — | 208 | 0.56 | 131 | After 5 minutes heated to 72° C. to get exotherm. |
| 17 (comparative) | 2X Bell | none | none | 2X ethyl-aluminum chloride-n-propoxide | none | 32 | 6 | — | 211 | 0.20 | 117 | After 5 minutes heated to 70° C. to get exotherm. |
| 18 (comparative) | Bell | none | none | ethyl-aluminum chloride-n-propoxide | 0.5 tert-butyl chloride | 32 | 30 | — | 219 | 0.58 | 139 | After 5 miinutes heated to 72° C. to get exotherm. A duplicate run gelled in 5 seconds; 0.82% residual $Cp_2$; Tg 136° C. |
| 19 (comparative) | std. | none | none | std. | none | 31 | 3 | 33 | 213 | 0.71 | 133 | — |
| 20 | std. | 0.5 boron tri-fluoride etherate | none | std. | 0.25 isobutyl chloride | 31 | 1 | 30 | 194 | — | — | — |
| 21 | std. | 0.5 boron tri-fluoride etherate | none | std. | 0.25 tert-butyl chloride | 32 | 1 | 30 | 202 | 0.10 | 140 | No dichlorodiphenylmethane. |
| 22 | std. | 0.5 boron tri-fluoride etherate | none | std. | 0.25 tert-butyl chloride | 32 | 1 | 23 | 200 | 0.15 | 141 | — |
| 23 (comparative) | std. | 0.5 boron tri-fluoride etherate | none | std. | none | 31 | 2–3 | 21 | 204 | 0.12 | 139 | No dichlorodiphenylmethane. |
| 24 (comparative) | std. | 0.5 boron tri-fluoride etherate | none | std. | none | 31 | 2–3 | 20 | 207 | 0.21 | 139 | — |
| 25 | Bell | 1.0 boron | 0.1 trimethyl | tributyltin hydride | 0.25 tert-butyl | 32 | 6 | — | 184 | — | — | Tert-butyl chloride mixed with tributyltin hydride before addition. Polymer foam 2.5 times usual size. |

TABLE 1-continued

Metathesis - Cationic Polymerization of Dicyclopentadiene

Std. activator used at 2000 monomer per W, with one dichlorodiphenylmethane per W in the catalyst.
Bell means $WOCl_2$ (0-2,6-diisopropylphenyl)$_2$ used at the same level. The order of addition to the monomer was from left to right across the table.
2X means double the usual amount.

| Example Number | Metathesis Catalyst | Lewis Acid Weight % | Moderator for Lewis Acid Weight % | Activator | Co-Catalyst for Lewis Acid Weight % | Initial Temp. C.° | Seconds to Gel | Seconds to 100° C. | Maximum Temp. °C. | % Residual Monomer | Glass Transition Temp. °C. | Notes |
|---|---|---|---|---|---|---|---|---|---|---|---|---|
| | | tri-fluoride etherate | phosphite | | chloride | | | | | | | |
| 26 (comparative) | Bell | none | none | ethyl-aluminum dichloride | none | 32 | instant | 14 | — | 1.24 | 127 | — |
| 27 (comparative) | Bell | none | 0.2 trimethyl phosphite | 0.5 ethyl-aluminum dichloride | none | 32 | 3 | 106 | 189 | 2.61 | 93 | — |
| 28 | Bell | 0.5 boron tri-fluoride etherate | 0.2 tributyl phosphite | tributyltin hydride | 0.25 benzyl chloride | 31 | 10 | 32 | 205 | 0.10 | 153 | Foamed plug twice normal size. |
| 29 | 2X std. | 0.5 boron tri-fluoride-N,N-diethyl-aniline | none | 2X std. | 0.33 tert-butyl chloride | 31 | <1 | 27 | 200 | 0.15 | 121 | — |
| 30 | 2X std. | 0.5 boron tri-fluoride tetra-hydro-furan | none | 2X std. | 0.33 tert-butyl chloride | 31 | 3 | 75 | 200 | 0.12 | 123 | — |
| 31 | 2X std. | 1.0 boron tri-fluoride-N,N-di-ethyl-aniline | none | 2X std. | 0.66 tert-butyl chloride | 31 | <1 | 26 | 205 | 0.18 | 121 | — |
| 32 | std. | 0.5 boron tri-fluoride etherate | 0.25 N,N-diethyl-aniline | std. | 0.25 tert-butyl chloride | 31 | 2–3 | 63 | 207 | 0.15 | 137 | — |
| 33 | std. | 0.5 boron tri-fluoride | none | std. | 0.5 isobutyl chloride | 31 | 4 | 49 | 199 | 0.12 | — | — |

TABLE 1-continued

Metathesis - Cationic Polymerization of Dicyclopentadiene

Std. activator used at 2000 monomer per W, with one dichlorodiphenylmethane per W in the catalyst.
Bell means $WOCl_2$ (0-2,6-diisopropylphenyl)$_2$ used at the same level. The order of addition to the monomer was from left to right across the table.
2X means double the usual amount.

| Example Number | Metathesis Catalyst | Lewis Acid Weight % | Moderator for Lewis Acid Weight % | Activator | Co-Catalyst for Lewis Acid Weight % | Initial Temp. C.° | Seconds to Gel | Seconds to 100° C. | Maximum Temp. °C. | % Residual Monomer | Glass Transition Temp. °C. | Notes |
|---|---|---|---|---|---|---|---|---|---|---|---|---|
| 34 | std. | etherate 0.5 boron tri-fluoride etherate | none | std. | 0.25 isobutyl chloride | 31 | <1 | — | 202 | 0.11 | — | — |
| 35 | std. | 0.5 boron tri-fluoride etherate | none | std. | 0.5 tert-butyl chloride | 31 | <1 | 36 | 199 | 0.10 | — | Duplicate runs 0.08 & 0.12% residual $Cp_2$. |
| 36 | std. | 0.5 boron tri-fluoride etherate | 0.3 pyridine | std. | 0.5 isobutyl chloride | 31 | 5-6 | 39 | 205 | 0.60 | — | — |
| 37 | std. | 0.5 boron tri-fluoride etherate | 1.6 qui-nuclidine | std. | 0.5 isobutyl chloride | 31 | 5 | 42 | 207 | 0.13 | — | — |
| 38 (compar-ative) | Bell | none | 0.6 diglyme | ethyl-aluminum dichloride | 0.5 tert-butyl chloride | 31 | — | — | 214 | 0.13 | — | No reaction in five miutes at 31° C. Heating to 60° C. gave the exotherm. |
| 39 | std. | 0.5 boron tri-fluoride etherate | 1.0 N,N-diethyl-aniline | std. | 0.25 tert-butyl chloride | 32 | 7-8 | 34 | 199 | 0.12 | — | — |
| 40 | std. | 0.5 boron tri-fluoride etherate | 0.6 diglyme | std. | 0.25 tert-butyl chloride | 32 | 7 | 36 | 205 | 0.10 | — | — |
| 41 | std. | 0.5 boron tri-fluoride etherate | 0.25 maleic anhydride | std. | 0.5 tert-butyl chloride | 32 | instant | 19 | 205 | 0.14 | — | — |
| 42 | Bell | 0.5 boron tri-fluoride etherate | 0.25 maleic anhydride 0.2 tributyl | tri-butyltin hydride | 0.25 benzyl chloride | 31 | 7 | 44 | 201 | 1.47 | 140 | — |

TABLE 1-continued

Metathesis - Cationic Polymerization of Dicyclopentadiene

Std. activator used at 2000 monomer per W, with one dichlorodiphenylmethane per W in the catalyst.
Bell means $WOCl_2$ (0-2,6-diisopropylphenyl)$_2$ used at the same level. The order of addition to the monomer was from left to right across the table.
2X means double the usual amount.

| Example Number | Metathesis Catalyst | Lewis Acid Weight % | Moderator for Lewis Acid Weight % | Activator | Co-Catalyst for Lewis Acid Weight % | Initial Temp. C.° | Seconds to Gel | Seconds to 100° C. | Maximum Temp. °C. | % Residual Monomer | Glass Transition Temp. °C. | Notes |
|---|---|---|---|---|---|---|---|---|---|---|---|---|
| 43 (comparative) | Bell | none | phosphite 0.6 butyl-diglyme | 0.50 ethyl-aluminum dichloride | 0.5 tert-butyl chloride | 31 | 120–140 | — | 209 | 0.10 | — | No reaction in 5 minutes. Heating to 47° C. gave exotherm. Monomer mixture slightly hazy. |
| 44 | Bell | 0.5 boron tri-fluoride etherate | 0.2 diglyme | tributyltin hydride | 0.5 tert-butyl chloride | 32 | instant | 10 | 169 | 0.07 | — | — |
| 45 (comparative) | Bell | none | 0.6 diglyme | ethyl-aluminum dichloride | 0.5 tert-butyl chloride | 75 | 1–2 | 44 | 225 | 0.43 | — | — |
| 46 | std. | 0.5 boron tri-fluoride etherate | 0.6 diglyme 0.25 maleic anhydride | std. | 0.5 tert-butyl chloride | 31 | 7 | 128 | 197 | 0.07 | — | — |
| 47 | std. | 0.5 boron tri-fluoride etherate | none | std. | 0.5 tert-butyl chloride | 31 | 1 | 15 | 207 | 0.28 | — | 91% gel, 177% swell. A duplicate run gave 0.07% residual dicyclopentadiene. |
| 48 | std. | 0.5 boron tri-fluoride etherate | 0.6 diglyme | std. | 0.25 tert-butyl chloride | 32 | 6 | 43 | 206 | 0.11 | — | Duplicate runs behaved similarly. |
| 49 | std. | 1.0 boron tri-fluoride etherate | 0.6 diglyme | std. | 0.5 tert-butyl chloride | 32 | 4 | 53 | 205 | 0.05 | — | — |
| 50 | std. | 0.5 boron tri-fluoride etherate | 0.6 diglyme | std. | 0.5 vinylbenzyl chloride | 31 | 12 | 300 | 189 | 0.06 | 129 | 0.09% vinylbenzyl chloride remained. |
| 51 | std. | 1.0 boron tri-fluoride etherate | 0.6 diglyme | std. | 0.5 tert-butyl chloride | 31 | 8 | 115 | 203 | 0.09 | 127 | — |
| 52 | std. | 0.5 boron | 0.6 diglyme | std. | 0.5 benzyl chloride | 31 | 5 | 21 | 204 | 0.08 | 126 | — |

TABLE 1-continued

Metathesis - Cationic Polymerization of Dicyclopentadiene

Std. activator used at 2000 monomer per W, with one dichlorodiphenylmethane per W in the catalyst.
Bell means $WOCl_2$ (0-2,6-diisopropylphenyl)$_2$ used at the same level. The order of addition to the monomer was from left to right across the table.
2X means double the usual amount.

| Example Number | Metathesis Catalyst | Lewis Acid Weight % | Moderator for Lewis Acid Weight % | Activator | Co-Catalyst for Lewis Acid Weight % | Initial Temp. C.° | Seconds to Gel | Seconds to 100° C. | Maximum Temp. °C. | % Residual Monomer | Glass Transition Temp. °C. | Notes |
|---|---|---|---|---|---|---|---|---|---|---|---|---|
| | | tri-fluoride etherate | | | | | | | | | | |
| 53 | std. | 0.5 boron tri-fluoride etherate | 0.6 diglyme | std. | 0.7 1-bromo-decane | 31 | 9 | 20 | 202 | 0.09 | 125 | — |
| 54 | std. | 0.5 boron tri-fluoride etherate | 0.6 diglyme | std. | 0.5 2-ethylhexyl bromide | 30 | 9 | 24 | 200 | 0.08 | 125 | — |
| 55 | std. | 0.5 boron tri-fluoride etherate | 0.6 diglyme | std. | 0.5 2-ethylhexyl chloride | 30 | 10 | 26 | 202 | 0.22 | 126 | — |
| 56 | std. | 0.5 boron tri-fluoride etherate | 0.6 diglyme | std. | 0.25 tert-butyl acetate | 30 | 7 | 26 | 205 | 0.34 | 127 | — |
| 57 (compar-ative) | std. | 0.5 boron tri-fluoride etherate | 0.6 diglyme | std. | none | 32 | 7 | 21 | 201 | 0.11 | 132 | — |
| 58 | 2X std. | 1.0 tin (IV) bromide | none | 2X std. | 0.5 tert-butyl chloride | 32 | instant | — | 207 | 0.07 | 107 | Temperature climbed from 32 to 40° C. in 5 minutes. Heating to 50° C. gave the exotherm. |
| 59 | std. | 1.1 tin (IV) chloride | 0.3 diglyme 0.25 maleic anhydride | std. | 1.0 isobutyl chloride | 32 | <1 | — | 224 | 0.36 | 117 | After 5 minutes, heated to 82° C. to get exotherm. |
| 60 | std. | 0.5 boron tri-fluoride etherate | 0.67 diglyme | std. | 0.5 tert-butyl chloride | 31 | 10 | 105 | 105 | 0.63 | — | 3 ml run with 0.8 × 10 cm steel rod in test tube. |
| 61 | std. | 0.5 boron tri- | 0.67 diglyme | std. | 0.5 tert-butyl chloride | 32 | 6 | 184 | 184 | 0.16 | — | — |

TABLE 1-continued

Metathesis - Cationic Polymerization of Dicyclopentadiene

Std. activator used at 2000 monomer per W, with one dichlorodiphenylmethane per W in the catalyst.
Bell means $WOCl_2$ (0-2,6-diisopropylphenyl)$_2$ used at the same level. The order of addition to the monomer was from left to right across the table.
2X means double the usual amount.

| Example Number | Metathesis Catalyst | Lewis Acid Weight % | Moderator for Lewis Acid Weight % | Activator | Co-Catalyst for Lewis Acid Weight % | Initial Temp. C.° | Seconds to Gel | Seconds to 100° C. | Maximum Temp. °C. | % Residual Monomer | Glass Transition Temp. °C. | Notes |
|---|---|---|---|---|---|---|---|---|---|---|---|---|
| | | fluoride etherate | | | | | | | | | | |
| 62 (comparative) | Bell | none | 0.85 n-hexyl ether | 0.5 ethyl-aluminum dichloride | 0.5 isobutyl chloride | 32 | 26 | — | 117 | 1.75 | — | Contained rod as in Ex. No. 24. Heated to 65° C. to get exotherm. |
| 63 | 2X std. | 0.5 boron tri-fluoride etherate | 0.67 diglyme | 2X std. | 0.5 isobuty chloride | 29 | 3 | — | 93 | 0.20 | — | Contained rod as in Ex. No. 24. Maximum temperature reached in 47 seconds. |
| 64 | std. | 1.0 boron tri-fluoride etherate | 0.67 diglyme | std. | 0.5 isobutyl chloride | 29 | 1–2 | 35 | 121 | 0.76 | — | Contained rod as in Ex. No. 24. |
| 65 (comparative) | Bell | none | 0.67 diglyme | 0.5 ethyl-aluminum dichloride | 0.5 isobutyl chloride | — | — | — | 124 | 2.86 | — | Contained rod as in Ex. No. 24. Heated to 80° C. to get exotherm. |
| 66 | 2X std. | 1.0 boron tri-fluoride etherate | 1.3 diglyme | 2X std. | 1.0 isobutyl chloride | 59 | — | 3.35 | 117.5 | 0.20 | — | Contained 3.75% EPDM rubber. Run on mini RIM machine. 100% swell; very little odor, possibly trace of odor of ethyl ether, 647 kg/cm$^2$ flexural strength, 5.0% flexural strain, 18900 kg/cm$^2$ flexural modulus, 6.8–6.9 mm deflection (9.2 kpsi flexural strength, 269 kpsi flexural modulus), 9.11 ft lb/inch width in notched Izod impact test at 23° C., 83° C. deflection temperature under 264 psi load. |
| 67 | 2X std. | 1.0 boron tri-fluoride etherate | 0.67 diglyme | 2X std. | 1.0 isobutyl chloride | 32 | 7 | 88 | — | 2.38 | — | Contained rod as in Ex. No. 24. |

TABLE 2

Metathesis - Cationic Copolymerization or Alkylation

Conventions as in Table 1. $Cp_2$ & $Cp_3$ inidcate di- and tricyclopentadiene. 2X means two times.

| Ex. Number | $Cp_2$ & $Cp_3$ | Other Monomer or Compound to be Alkylated | Metathesis Catalyst | Lewis Acid Weight % | Moderator for Lewis Acid Weight % | Activator | Cocatalyst for Lewis Acid | Initial Temp. °C. | Seconds to Gel | Seconds to 100° C. | Max. Temp. °C. | % Residual $Cp_2$ | % Residual Other Compound | Glass Trans. Temp. °C. | Notes |
|---|---|---|---|---|---|---|---|---|---|---|---|---|---|---|---|
| 68 | 80 $Cp_2$ | 20 m-diisopropenylbenzene | std. | 1 $BF_3$ etherate | none | std. | 0.5 isobutyl chloride | 31 | <1 | 54 | 192 | — | — | — | Activator and isobutyl chloride combined before addition. |
| 69 | 80 $Cp_2$ | 20 m-diisopropenylbenzene | std. | 1 $BF_3$ etherate | none | Std. | 0.5 isobutyl chloride | 4 | 30–50 | 306 | 189 | 0.01 | — | — | Put in 33° C. block after 60 sec. Post-cured 90° C./1 hr. |
| 70 | 80 $Cp_2$ | 20 m-diisopropenylbenzene | std. | 1 $BF_3$ etherate | none | std. | 0.5 chloro-di-phenyl-methane | 31 | 2–3 | — | 203 | — | — | — | Ten minutes to 46° C., then heated to 55° C. to get the strong exotherm. |
| 71 | 80 $Cp_2$ | 20 m-diisopropenylbenzene | std. | 0.5 $BF_3$ etherate | none | std. | 0.5 isobutyl chloride | 32 | 1 | 47 | 179 | 0.00–0.02 | 1.30 m-diisopropenylbenzene | 107 | Activator and isobutyl chloride combined before addition. 6.9% higher GC peaks present. |
| 72 | 80 $Cp_2$ | 20 m-diisopropenylbenzene | std. | 0.5 $BF_3$ etherate | none | std. | 0.25 isobutyl chloride | 32 | 2–3 | 50 | 181 | 0.01–0.02 | 1.24 m-diisopropenylbenzene | — | — |
| 73 (comparative) | 60 $Cp_2$ 40 $Cp_3$ | none | std. | none | none | std. | none | 3 | — | — | 191 | 0.57 | — | 182 | Exotherm after placing in 33° C. block. |
| 74 | 60 $Cp_2$ 40 $Cp_3$ | none | std. | 1 $BF_3$ etherate | none | std. | 0.5 isobutyl chloride | 3 | 2–3 | — | 186 | 0.02 | — | none observed | Exotherm after placing in 33° C. block. Activator and isobutyl chloride combined before addition. |
| 75 | 80 $Cp_2$ | 20 α-methylstyrene | std. | 1 $BF_3$ etherate | none | std. | 0.5 isobutyl chloride | 3 | 1 | 175 | 170 | 0.02–0.03 | 0.42 α-methylstyrene | 69.5 | Exotherm after placing in 33° C. block, 14.7% of α-methyl-styrene dimer present. |
| 76 | 80 $Cp_2$ | 20 5-ethylidene-2-norbornene | std. | 1 $BF_3$ etherate | none | std. | 0.5 isobutyl chloride | 2 | — | — | 186 | 0.04–0.06 | 0 5-ethylidene-2-norbornene | none observed | Placed in 33° C. block after four minutes. |
| 77 | 80 $Cp_2$ | 15 α-methylstyrene 5 m-diisopropenylbenzene | std. | 0.5 $BF_3$ etherate | none | std. | 0.25 isobutyl chloride | 0 | 300 | 415 | 158 | 0.01–0.02 | 0.26 α-methylstyrene, 0.10 m-diisopropenylbenzene | none observed | Put in 32° C. block after five minutes. Post cured 90° C./1 hr. 8.1% α-methylstyrene dimer present. |
| 78 | 80 $Cp_2$ | 13 m-diisopropenylbenzene 7 naphthalene | std. | 0.5 $BF_3$ etherate | none | std. | 0.25 isobutyl chloride | 32 | 2–3 | — | 176 | 0.00–0.01 | 0.43 m-diisopropenylbenzene 0.62 naphthalene | 72.5 | — |
| 79 | 80 $Cp_2$ | 15 β-pinene | std. | 0.5 $BF_3$ | none | std. | 0.25 | 31 | 1 | 57 | 183 | 0.16 | 0 β-pinene | 80 | 2.0% unknown GC peaks |

TABLE 2-continued

Metathesis - Cationic Copolymerization or Alkylation

Conventions as in Table 1. $Cp_2$ & $Cp_3$ inidcate di- and tricyclopentadiene. 2X means two times.

| Ex. Number | $Cp_2$ & $Cp_3$ | Other Monomer or Compound to be Alkylated | Metathesis Catalyst | Lewis Acid Weight % | Moderator for Lewis Acid Weight % | Activator | Cocatalyst for Lewis Acid | Initial Temp. °C. | Seconds to Gel | Seconds to 100° C. | Max. Temp. °C. | % Residual $Cp_2$ | % Residual Other Compound | Glass Trans. Temp. °C. | Notes |
|---|---|---|---|---|---|---|---|---|---|---|---|---|---|---|---|
| | | 5 m-diisopropenyl-benzene | | etherate | | | isobutyl chloride | | | | | | 0.22 m-diiso-propenyl-benzene | | between β-pinene and m-diisopropenylbenzene, 5.8% higher than m-diisopropenylbenzene. |
| 80 | 95 $Cp_2$ | 5 2,6-di-tert-butylphenol | std. | 0.5 $BF_3$ etherate | none | std. | 0.25 isobutyl chloride | 31 | 1 | 42 | 198 | 0.04–0.06 | 5.6 2,6-di-tert-butyl-phenol | 111 | — |
| 81 | 90 $Cp_2$ | 10 naphthalene | std. | 0.5 $BF_3$ etherate | none | std. | 0.25 isobutyl chloride | 31 | 1 | 27 | 185 | 0.16–0.23 | 12.9 naphtha-lene | 70 | Plug slightly foamed. |
| 82 | 80 $Cp_2$ | 20 polyisoprene | std. | 0.5 $BF_3$ etherate | none | std. | 0.25 isobutyl chloride | 31 | 5 | 66 | 182 | 0.06 | — | 110 | Rubber, catalyst and Lewis acid in half the $Cp_2$; rubber activator and co-catalyst in the other half. |
| 83 | 95 $Cp_2$ | 5 diphenylamine | Bell | — | none | 0.5 ethyl-aluminum di-chloride | 0.25 tert-butyl chloride | 31 | 1 | 57 | 179 | 0.06–0.29 | 3.87 diphenyl-amine | 101 | Poorly mixed. |
| 84 | 48 $Cp_2$ 32 $Cp_3$ | 20 polyisoprene | std. | 0.5 boron tri-fluoride etherate | none | std. | 0.25 tert-butyl chloride | 31 | 3 | — | 192 | 0.98 | — | none ob-served | 10 ml run. Rubber, catalyst and Lewis acid in half the monomer; activator and cocatalyst in the other. After 5 minutes the temperature was 39° C. Heating to 65° C. gave the exotherm. Post-cured at 90° C./1 hour. |
| 85 | 80 $Cp_2$ | 20 m-diisopro-penylbenzene | std. | 0.5 boron tri-fluoride-N,N-di-ethyl-aniline | none | std. | 0.25 tert-butyl chloride | 30 | 8–9 | 94 | 173 | 0.11 | — | — | — |
| 86 | 80 $Cp_2$ | 20 m-diisopro-penylbenzene | std. | 0.5 boron tri-fluoride tetra-hydro-furan | none | std. | 0.25 tert-butyl chloride | 31 | 8 | — | 194 | — | — | — | After five minutes at 31° C., heated to 60° C. to get exotherm. |
| 87 | 80 $Cp_2$ | 20 5-ethylidene-2-norbornene | std. | 0.5 boron tri-fluoride etherate | none | std. | 0.5 isobutyl chloride | 0 | <1 | — | 199 | 0.09 | — | — | Placed in block at 31° C. after 5 minutes. |
| 88 | 60 $Cp_2$ | none | std. | 1.0 | none | std. | 0.5 tert- | 3 | 3 | — | 166 | 0.22 | — | — | Put in 32° C. block after |

TABLE 2-continued

Metathesis - Cationic Copolymerization or Alkylation

Conventions as in Table 1. $Cp_2$ & $Cp_3$ inidcate di- and tricyclopentadiene. 2X means two times.

| Ex. Number | $Cp_2$ & $Cp_3$ | Other Monomer or Compound to be Alkylated | Metathesis Catalyst | Lewis Acid Weight % | Moderator for Lewis Acid Weight % | Activator | Cocatalyst for Lewis Acid | Initial Temp. °C. | Seconds to Gel | Seconds to 100° C. | Max. Temp. °C. | % Residual $Cp_2$ | % Residual Other Compound | Glass Trans. Temp. °C. | Notes |
|---|---|---|---|---|---|---|---|---|---|---|---|---|---|---|---|
| | 40 $Cp_3$ | | | boron tri-fluoride etherate | | | butyl chloride | | | | | | | | 5 minutes. |
| 89 | 60 $Cp_2$ 40 $Cp_3$ | none | std. | 0.5 boron tri-fluoride etherate | none | std. | 0.25 tert-butyl chloride | 3 | 4 | — | 171 | 0.44 | — | — | Put in 32° C. block after 5 minutes. |
| 90 (com-parative) | 60 $Cp_2$ 40 $Cp_3$ | none | std. | none | none | std. | none | 3 | 300 | — | 160 | 1.40 | — | — | Put in 32° C. block after 5 minutes. |
| 91 | 60 $Cp_2$ 40 $Cp_3$ | none | std. | 0.5 boron tri-fluoride etherate | none | std. | 0.25 tert-butyl chloride | 32 | 1 | 30 | 201 | 0.22 | — | — | — |
| 92 | 42 $Cp_2$ 28 $Cp_3$ | 15 5-ethylidene-2-norbornene 15 polyisoprene | Bell | none | 0.6 diglyme | ethyl-aluminum dichloride | 1.0 2-ethylhexyl bromide | 32 | — | — | 202 | 0.75 | — | — | No reaction in 5 minutes. Heating to 70° C. produced the exotherm. A duplicate run had no residual $Cp_2$, $Cp_3$, or 5-ethylidene-2-norbornene and had Tg 154° C. |
| 93 | 75 $Cp_2$ | 20 5-ethylidene-2-norbornene 5 diphenylamine | Bell | none | 0.6 diglyme | ethyl-aluminum dichloride | 0.5 tert-butyl chloride | 32 | — | — | 218 | none | no 5-ethyl idene-2-nor-bornene 2.79% diphenyl-amine | — | No reaction in 5 minutes. Heating to 60° C. induced the exotherm. |
| 94 | 75 $Cp_2$ | 20 5-ethylidene-2-norbornene 5 2,6-di-tert-butylphenol | Bell | none | 0.6 diglyme | ethyl-aluminum dichloride | 0.5 tert-butyl chloride | 32 | — | — | 205 | none | no 5-ethylidene-2-nor-bornene 2.71% 2,6-di-tert-butyl-phenol | — | No reaction in 5 minutes. Heating to 70° C. gave the exotherm. |
| 95 | 42 $Cp_2$ 28 $Cp_3$ | 15 5-ethylidene-2-norbornene 15 polyisoprene | Bell | none | 0.6 diglyme | ethyl-aluminum dichloride | 1.0 2-ethyl-hexyl bromide | 31 | — | — | — | none | no $Cp_3$ no 5-ethylidene-2-nor-bornene | 154 | No reaction in 5 minutes. Heated 90° C./1 hour. Extraction of a duplicate run with methylene chloride removed 8.4%, compared to 0.5% for a control run with monomer ratios, 51:34:15:0. |
| 96 | 95 $Cp_2$ | 5 p-diisopro- | Bell | none | 0.6 | ethyl- | 0.5 | 31 | — | — | 170 | 0.16 | 0.49 p- | 100 | Mixed at 31° C., then |

TABLE 2-continued

Metathesis - Cationic Copolymerization or Alkylation

Conventions as in Table 1. $Cp_2$ & $Cp_3$ inidcate di- and tricyclopentadiene. 2X means two times.

| Ex. Number | $Cp_2$ & $Cp_3$ | Other Monomer or Compound to be Alkylated | Metathesis Catalyst | Lewis Acid Weight % | Moderator for Lewis Acid Weight % | Activator | Cocatalyst for Lewis Acid | Initial Temp. °C. | Seconds to Gel | Seconds to 100° C. | Max. Temp. °C. | % Residual $Cp_2$ | % Residual Other Compound | Glass Trans. Temp. °C. | Notes |
|---|---|---|---|---|---|---|---|---|---|---|---|---|---|---|---|
| | | penylbenzene | | | diglyme | aluminum dichloride | tert-butyl chloride | | | | | | diiso-propenyl-benzene | | heated immediately to 73° C. |
| 97 | 90 $CP_2$ | 10 p-diisopro-penylbenzene | Bell | none | 0.6 diglyme | ethyl-. aluminum dichloride | 0.5 tert-butyl chloride | 32 | — | — | — | 0.10 | 0.54 p-diiso-propenyl-benzene | 94 73° C. | Mixed at 31° C., then heated immediately to |
| 98 | 54 $Cp_2$ 36 $Cp_3$ | 5 naphthalene 5 diiso-butylene | std. | 1.0 boron tri-fluoride etherate | 0.6 diglyme | std. | 0.5 tert-butyl chloride | 31 | 4 | 84 | 179 | 0.17 | 4.58 naphtha-lene 3.15 diiso-butylene | 125 | — |
| 99 | 80 $Cp_2$ | 20 polyindane | std. | 0.5 boron trifluor ide etherate | 0.6 diglyme | std. | 0.5 tert-butyl chloride | 31 | 12 | 148 | 169 | 0.12 | — | 126 | Polyindane made by treat-ment of m-diisopropenyl-benzene with acid. |
| 100 | 95 $Cp_2$ | 5 poly (vinylbenzyl chloride) | std. | 0.5 boron trifluo-ride etherate | 0.6 diglyme | std. | 0.5 tert-butyl chloride | 32 | 2 | 45 | 181 | 0.20 | — | 135 | — |
| 101 (com-parative) | 80 $Cp_2$ | 20 acenaph-thylene | std. | none | 0.6 diglyme | std. | 0.25 tert-butyl chloride | 31 | 12 | — | 200 | 0.14 | 6.1 acenaph-thylene | 109 | After 5 minutes at 31° C., heated to 55° C. to get exotherm. |
| 102 (com-parative) | 90 $Cp_2$ | 10 5,5'-sulfonyl-bis(2-norbornene) | std. | none | 0.6 diglyme | std. | 0.25 tert-butyl chloride | 31 | 200 | — | 203 | 0.95 | 0.36 5,5'-sulfonyl-bis(2-norbor-nene) | 164 | After 5 minutes at 31° C., heated to 63° C. to get exotherm. |
| 103 (com-parative) | 90 $Cp_2$ | 10 5,5'-sulfonyl-bis(2-norbornene) | std. | none | none | std. | none | 31 | 14 | 40 | 199 | 0.90 | — | 142 | — |
| 104 (com-parative) | 48 $Cp_2$ 32 $Cp_3$ | 10 polyisoprene 10 hexamethy-lene-bis(5-norbornene-2-carboxylate) | Bell | none | 0.6 diglyme | ethyl-aluminum dichloride | 0.5 tert-butyl chloride | 31 | — | — | 200 | 0.62 | 0.08 $Cp_3$ 0.12 diester | 178 — | Heated to 73° C. to get exotherm. |
| 105 (com-parative) | same | same | 2X std. | none | none | 2X std. | none | 31 | 26 | 56 | 169 | 0.30 | — | 158 | — |
| 106 | 90 $Cp_2$ | 10 1,4,5,8-dimethano-1,4,4a,5,8,8a- | std. | 0.5 boron tri- | 0.6 diglyme | std. | 0.25 tert-butyl chloride | 31 | 6 | 22 | 205 | 0.08 | 0 di-methanohex ahydro- | 177 | — |

TABLE 2-continued

Metathesis - Cationic Copolymerization or Alkylation

Conventions as in Table 1. $Cp_2$ & $Cp_3$ inidcate di- and tricyclopentadiene. 2X means two times.

| Ex. Number | $Cp_2$ & $Cp_3$ | Other Monomer or Compound to be Alkylated | Metathesis Catalyst | Lewis Acid Weight % | Moderator for Lewis Acid Weight % | Activator | Cocatalyst for Lewis Acid | Initial Temp. °C. | Seconds to Gel | Seconds to 100° C. | Max. Temp. °C. | % Residual $Cp_2$ | % Residual Other Compound | Glass Trans. Temp. °C. | Notes |
|---|---|---|---|---|---|---|---|---|---|---|---|---|---|---|---|
| | | hexahydro-naphthalene | | fluoride | | | | | | | | | naphtha-lene | | |
| 107 (com-parative) | 90 $Cp_2$ | 10 1,4,5,8-dimethano-1,4,4a,5,8,8a-hexahydro-naphthalene | std. | none | none | std. | none | 32 | 2 | 27 | 212 | 0.97 | — | 168 | — |
| 108 (com-parative) | 73 $Cp_2$ | 18 polyisoprene 9 N,N'-diphenyl-p-phenylene-diamine | Bell | none | 0.6 diglyme | ethyl-aluminum dichloride | 0.5 tert-butyl chloride | — | — | — | 179 | 0.06 | 9.1 diamine | 96 | The exotherm occurred on heating to 100° C. |
| 109 | 80 $Cp_2$ | 13 5-ethylidene-2-norbornene 7 naphthalene | Bell | none | 0.6 diglyme | ethyl-aluminum dichloride | 0.5 tert-butyl chloride | — | — | — | 197 | 0.14 | 0 5-ethylidene-2-norbor-nene 6.4 naphtha-lene | 76 | Heated to 63° C. to get exotherm. |
| 110 | 70 $Cp_2$ | 20 5-ethylidene-2-norbornene 10 1,5-cycloocta-diene | std. | 1.0 boron tri-fluoride | 0.6 diglyme | std. | 0.5 tert-butyl chloride | 31 | 9 | 38 | 201 | 0 | 0 5-ethylidene-2-norbor-nene 5.3 1,5-cycloocta-diene | 92 | — |
| 111 | 70 $Cp_2$ | 20 5-ethylidene-2-norbornene 10 1,5,9-cyclododeca-triene | std. | 1.0 boron trifluor ide | 0.6 diglyme | std. | 0.5 tert-butyl chloride | 31 | 9 | 37 | 197 | 0 | 0 5-ethylidene-2-norbor-nene 7.4 1,5,9-cyclodo-decatriene | 97 | — |
| 112 | 80 $Cp_2$ | 13 poly-isoprene 7 naphthalene | Bell | none | 0.6 diglyme | ethyl-aluminum dichloride | 0.5 tert-butyl chloride | — | — | — | 181 | — | — | 102 | Heated to 75° C. to get exotherm. Some foaming. |
| 113 | 54 $Cp_2$ 36 $Cp_3$ | 10 hexamethyl-cyclo-trisiloxane | std. | 0.5 boron tri-fluoride etherate | 0.6 diglyme | std. | 0.5 tert-butyl chloride | 31 | instant | — | 134 | 5.95 | 2.46 $Cp_3$ 1.94 hexamethyl cyclotri-siloxane | 82 | Activator, tert-butyl chloride and diglyme mixed with monomers before adding catalyst and boron trifluoride etherate. Poor mixing. |
| 114 | 42 $Cp_2$ 28 $Cp_3$ | 15 5-ethylidene-2-norbornene 15 polyisoprene | 2X Bell | 1.0 boron trifluor ide etherate | 0.6 diglyme | 2X ethyl-aluminum di-chloride | 0.5 isobutyl chloride | — | — | — | 184 | — | — | 146 | Heated to 75° C. to get the exotherm. |

TABLE 2-continued

Metathesis - Cationic Copolymerization or Alkylation

Conventions as in Table 1. $Cp_2$ & $Cp_3$ inidcate di- and tricyclopentadiene. 2X means two times.

| Ex. Number | $Cp_2$ & $Cp_3$ | Other Monomer or Compound to be Alkylated | Metathesis Catalyst | Lewis Acid Weight % | Moderator for Lewis Acid Weight % | Activator | Cocatalyst for Lewis Acid | Initial Temp. °C. | Seconds to Gel | Seconds to 100° C. | Max. Temp. °C. | % Residual $Cp_2$ | % Residual Other Compound | Glass Trans. Temp. °C. | Notes |
|---|---|---|---|---|---|---|---|---|---|---|---|---|---|---|---|
| 115 | 42 $Cp_2$ 28 $Cp_3$ | 15 5-ethylidiene-2-norbornene 15 polyisoprene | 2X std. | 1.0 boron trifluor ide | none | 2X std. | 0.5 isobutyl chloride | 31 | 10 | 56 | 169 | — | — | 150 | See Ex. No. 136 for extraction of the rubber. |
| 116 | 95 $Cp_2$ | 5 p-diisopro-penylbenzene | 2X std. | 1.0 Tin (IV) bromide | none | 2X std. | 0.5 isobutyl chloride | — | — | — | 207 | — | — | 79 | Heated to 63° C. to get exotherm. |
| 117 | 90 $Cp_2$ | 10 m-diisopro-penylbenzene | 2X std. | 1.0 Tin (IV) bromide | none | 2X std. | 0.5 isobutyl chloride | — | — | — | 187 | — | — | 54 | Heated to 63° C. to get exotherm. |
| 118 | 90 $Cp_2$ | 10 polyisoprene | 2X std. | 0.7 Tin (IV) bromide | none | 2X std. | 0.5 isobutyl chloride | — | — | — | 203 | 0.13 | — | 132 | Heated to 57° C. to get exotherm. |
| 119 | 48 $Cp_2$ 32 $Cp_3$ | 10 polyisoprene 10 hexamethy-lene-bis(2-nor-bornene-5 carboxylate) | Bell | none | 0.85 n-hexyl ether | 0.5 ethyl-aluminum di-chloride | 0.5 tert-butyl chloride | — | — | — | 211 | 0.21 | 0.01 $Cp_3$ <0.11 diester | none ob-served | Heated to 80° C. to get exotherm. |
| 120 | 48 $Cp_2$ 32 $Cp_3$ | 10 polyisoprene 10 hexamethylene bis(2-norborene-5-carboxylate) | Bell | none | 0.6 butyl diglyme | diethyl-aluminum chloride 6 Al/W | 0.5 tert-butyl chloride | — | — | — | 182 | 0.59 | 0.34 $Cp_3$ <0.11 diester | 153 | Heated to 75° C. to get exotherm. |
| 121 | 80 $Cp_2$ | 20 5-ethylidiene-2-norbornene | std. | 0.5 boron tri-fluoride etherate | 0.67 diglyme | std. | 0.5 isobutyl chloride | — | 1 | — | — | 0.47 | — | — | 3 ml. run with 0.8 × 10 cm steel rod in test tube. |
| 122 | 80 $Cp_2$ | 20 5-ethylidene-2-norbornene | 2X std. | 1.0 boron tri-fluoride etherate | 1.3 diglyme | 2X std. | 1.0 isobutyl chloride | 32 | 5 | 13 | — | 0.11 | — | — | Contained steel rod as in Ex. No. 121 |
| 123 | 80 $Cp_2$ | 20 5-ethylidene-2-norbornene | 2X std. | 1.0 boron tri-fluoride etherate | 1.3 diglyme | 2X std. | 1.0 isobutyl chloride | 51 | — | instant | 98.5 | 0.40 | — | — | Contained EPDM rubber. Odor not of dicylco-pentadiene, possibly of 5-ethylidene-2-norbornene; 280% swell; 624 kg/cm$^2$ (8.9 kpsi) flexural strength, 5.00% flexural strain, 18500 kg/cm$^2$ (263 kpsi) |

TABLE 2-continued

Metathesis - Cationic Copolymerization or Alkylation

Conventions as in Table 1. $Cp_2$ & $Cp_3$ inidcate di- and tricyclopentadiene. 2X means two times.

| Ex. Number | $Cp_2$ & $Cp_3$ | Other Monomer or Compound to be Alkylated | Metathesis Catalyst | Lewis Acid Weight % | Moderator for Lewis Acid Weight % | Activator | Cocatalyst for Lewis Acid | Initial Temp. °C. | Seconds to Gel | Seconds to 100° C. | Max. Temp. °C. | % Residual $Cp_2$ | % Residual Other Compound | Glass Trans. Temp. °C. | Notes |
|---|---|---|---|---|---|---|---|---|---|---|---|---|---|---|---|
| | | | | | | | | | | | | | | | flexural modulus, 6.77–6.90 mm deflection; 7.28 ft lb/inch width in notched Izod impact test at 23° C.; 79° C. deflection temperature under 264 psi load. |
| 124 | 80 $Cp_2$ | 20 5-ethylidene-2-norbornene | Bell | none | none | ethyl-aluminum chloride-n-propoxide | 0.5 tert-butyl chloride | 32 | 2–3 | — | 224 | 0.06 | — | 124 | After 5 minutes heated to 72° C. to get exotherm. |
| 125 | 80 $Cp_2$ | 20 4-methylstyrene | Bell | none | none | ethyl-aluminum chloride-n-propoxide | 0.5 tert-butyl chloride | 32 | 400 | — | 184 | 0.53 | — | 48 | After 5 minutes heated to 72° C. to get exotherm. |
| 126 | 75 $Cp_2$ | 15 5-ethylidene-2-norbornene 10 dimethano-hexahydro-naphthalene | std. | 0.5 boron tri-fluoride etherate | 0.6 diglyme | std. | 0.25 isobutyl chloride | 30 | 5 | 23 | 226 | 0.07 | — | 175 | — |
| 127 | same | same | 2X std. | 1.0 boron tri-fluoride etherate | 1.25 diglyme | 2X std. | 1.0 isobutyl chloride | 31 | — | — | — | 0.26 | — | none ob-served | Contained steel rod as in Ex. No. 121 |
| 128 | 45 $Cp_2$ 30 $Cp_3$ | same | std. | 0.5 boron tri-fluoride etherate | 0.6 diglyme | std. | 0.25 isobutyl chloride | 31 | 5 | 21 | 229 | 0.08 | — | none ob-served | |
| 129 | same | same | 2X std. | 1.0 boron tri-fluoride etherate | 1.25 diglyme | 2X std. | 1.0 isobutyl chloride | 3 | — | — | — | 0.21 | — | none ob-served | Contained steel rod as in Ex. No. 121 |
| 130 | 70 $Cp_2$ | 15 5-ethylidene-2-norbornene 15 polyindane | 2X std. | 1.0 boron tri-fluoride etherate | 1.3 diglyme | 2X std. | 1.0 isobutyl chloride | 31 | 7 | 21 | 178 | 0.09 | — | 114 | Extraction overnight twice with methylene chloride removed 20.5%. |
| 131 (com-parative) | 42 $Cp_2$ 28 $Cp_3$ | 15 5-ethylidene-2-norbornene 15 polyisoprene | std. | none | none | std. | none | 31 | 3 | — | 207 | 0.64 | — | 166 | After 5 minutes heated to 90° C. to get exotherm. |
| 132 (com-parative) | same | same | 2X std. | none | none | 2X std. | none | 31 | 3 | 79 | 158 | 0.54 | — | 145 | |

TABLE 2-continued

Metathesis - Cationic Copolymerization or Alkylation

Conventions as in Table 1. $Cp_2$ & $Cp_3$ inidcate di- and tricyclopentadiene. 2X means two times.

| Ex. Number | $Cp_2$ & $Cp_3$ | Other Monomer or Compound to be Alkylated | Metathesis Catalyst | Lewis Acid Weight % | Moderator for Lewis Acid Weight % | Activator | Cocatalyst for Lewis Acid | Initial Temp. °C. | Seconds to Gel | Seconds to 100° C. | Max. Temp. °C. | % Residual $Cp_2$ | % Residual Other Compound | Glass Trans. Temp. °C. | Notes |
|---|---|---|---|---|---|---|---|---|---|---|---|---|---|---|---|
| 133 | 70 $Cp_2$ | 15 5-ethylidene-2-norbornene 15 poly-(dicyclo-pentadiene) | 2X std. | 1.0 boron tri-fluoride etherate | 1.3 diglyme | 2X std. | 1.0 isobutyl chloride | 28 | 1–2 | 17 | 165 | 0.06 | — | 127 | Polydicyclopentadiene made with aluminum chloride. Extraction with methylene chloride overnight twice removed 11.7% |
| 134 | 54 $Cp_2$ 36 $Cp_3$ | 10 hexamethyl-cyclotri-siloxane | std. | 0.5 boron tri-fluoride etherate | 0.6 diglyme | std. | 0.5 isobutyl chloride | 31 | 5 | — | 197 | 0.02–0.04 | 0.05 $Cp_3$, 3.3 siloxane | 159 | Went from 31° C. to 40° C. in 5 minutes. Heated to 47° C. to get exotherm. |
| 135 | 54 $Cp_2$ 36 $Cp_3$ | 10 hexamethyl-cyclotri-siloxane | std. | none | none | std. | 0.5 isobutyl chloride | 32 | 3 | 26 | 208 | — | — | — | — |
| 136 | 42 $Cp_2$ 28 $Cp_3$ | 15 5-ethylidene-2-norbornene 15 polyisoprene | 2X std. | 1.0 boron tri-fluoride etherate | none | 2X std. | 0.5 isobutyl chloride | 31 | 8 | 76 | 174 | — | — | — | A duplicate of Ex. No. 115. Extraction overnight twice with methylene chloride removed 12%. |
| 137 | 95 $Cp_2$ | 5-p-diisopro-penylbenzene | 2X std. | 1.0 tin (IV) bromide | none | 2X std. | 0.5 isobutyl chloride | 31 | 30 | — | 195 | — | — | — | A duplicate of Ex. No. 116. Went from 31° C. to 34° C. in 5 minutes. Heated to 63° C. to get the exotherm. Two overnight extractions with methylene chloride removed 13%. |

TABLE 3

Metathesis - Anionic Polymerization of Dicyclopentadiene

| Example Number | $Cp_2$ & $Cp_3$ | Other Monomer | Metathesis Catalyst | Moderator | Procatalyst Activator/ Anionic | Initial Temp °C. | Seconds to Gel | Seconds to 100° C. |
|---|---|---|---|---|---|---|---|---|
| 138 | 100 $Cp_2$ | none | Bell | none | n-butyllithium | 31 | 1 | 194 |
| 139 | 100 $Cp_2$ | none | Bell | none | dibutylzine | 32 | 3 | 36 |
| 140 | 48 $Cp_2$ 32 $Cp_3$ | 20 caprolactone | Bell | none | dibutylzinc | 31 | 11 | |
| 141 | same | same | 2X std. | none | 2X std. | 31 | — | — |
| 142 | 60 $Cp_2$ 40 $Cp_3$ | none | 2X std. | none | 2X std. | 31 | 3 | 24 |
| 143 | 48 $Cp_2$ 32 $Cp_3$ | 20 caprolactone | std. | none | dibutylzinc | 31 | — | — |
| 144 | 54 $Cp_2$ 36 $Cp_3$ | 10 hexamethyl-cyclotri-siloxane | Bell | none | dibutylzinc | 30 | 5 | 38 |

| Example Number | Maximum Temp °C. | % Residual $Cp_2$ | % Residual Other Monomer | Glass Trans. Temp °C. | Notes |
|---|---|---|---|---|---|
| 138 | 139 | — | — | 113 | Poor mixing. Post-cured 90° C./1 hour. |
| 139 | 195 | 3.58 | — | 152 | Temperature rose to 40° C. in 5 minutes. |
| 140 | 181 | 1.12–1.25 | 0.71 $Cp_3$—caprolacton | — | Heating to 72° C. gave the strong exotherm. 10% weight loss by 370° C. (under nitrogen, at 20° C./minute). |
| 141 | — | 0.54 | | 151 | Exotherm sometime after 5 minutes. 7% weight loss by 370° C. |
| 142 | 203 | — | — | — | Control for Ex. No. 141. 3.5% weight loss by 370° C. |
| 143 | 164 | 3.12 | — | 135 | Went from 31° C. to 61° C. in 5 minutes. Heating to 75° C. gave the exotherm. |
| 144 | 187 | 0.38 | — | 147 | — |

TABLE 4

Metathesis - Free Radical Copolymerization

Conventions as in Tables 1, 2 and 3. Azobis means 2,2'-azobis(2-methylpropionitrile). Solids were put in the tube first. The free radical sources were dissolved in the monomers first.

| Ex. Number | $Cp_2$ & $Cp_3$ | Other Monomer | Metathesis Catalyst | Methasis Activator | Free Radical Source, Weight % | Initial Temp. °C. | Seconds to Gel |
|---|---|---|---|---|---|---|---|
| 145 | 100 $Cp_2$ | none | std. + 1 diglyme/W | std. | 0.5 azobis 0.5 dicumyl peroxide | 31 | 3 |
| 146 | 100 $Cp_2$ | none | std. + 1 diglyme/W | std. | 0.5 azobis 0.5 2,5-dimethyl-2,5-di-tert-butylperoxy hexane | 32 | 2–3 |
| 147 | 100 $Cp_2$ | none | std. + 1 diglyme/W | std. | 0.5 2,2'-azobis(2-methylbutyronitrile) 0.5 dicumyl peroxide | 32 | 2–3 |
| 148 | 100 $Cp_2$ | none | 2X std. | 2X std. | 0.5 tert-butylperoxyoctoate 0.5 dicumyl peroxide | 32 | 10 |
| 149 | 100 $Cp_2$ | none | std. | std. | 0.5 1,1'-azobis (cyclohexanecarbo-nitrile) 0.5 dicumyl peroxide | 32 | 6 |
| 150 | 100 $Cp_2$ | none | std. + 1 diglyme/W | std. | 0.5 2,2'-azobis(2-methylbutyronitrile) 0.5 tert-butyl-peroxide | 31 | 4 |
| 151 | 100 $Cp_2$ | none | std. | std. | 1.25 1,1-bis(tert-butylperoxy)-3,3,5-trimethylcyclohexane (40% on $CaCO_3$) 1.0 dicumyl peroxide | 30 | 5 |
| 152 | 100 $Cp_2$ | none | 2X std. | 2X std. | 0.5 tert-butyl peroctoate 0.5 2,5-dimethyl-2,5-di-tert-butylperoxyhexane | 32 | 5 |
| 153 | 100 $Cp_2$ | none | std. | std. | 0.5 2,2'-azobis(2- | 27 | 3 |

TABLE 4-continued

Metathesis - Free Radical Copolymerization

Conventions as in Tables 1, 2 and 3. Azobis means 2,2'-azobis(2-methylpropionitrile). Solids were put in the tube first. The free radical sources were dissolved in the monomers first.

| | | | | | | | |
|---|---|---|---|---|---|---|---|
| | | | | | methylbutyronitrile) 0.5 azo-tert-butane | | |
| 154 | 90 $Cp_2$ | 7.5 isobornyl methacrylate 2.5 trimethylolpropane-trimethacrylate | 2X std. | 2X std. | 0.5 2,2'-azobis(2-methyl-butyronitrile) 0.5 dicumyl peroxide | 32 | 5 |
| 155 | same | same | 2X std. | 2X std. | 0.5 tert-butyl peroctoate 0.5 dicumyl peroxide | 32 | 6 |
| 156 | 80 $Cp_2$ | 15 4-methylstyrene 5 divinylbenzene | 2X std. | 2X std. | same | 32 | 12 |
| 157 | 80 $Cp_2$ | 15 isobornyl methacrylate 5 trimethylolpropane-trimethacrylate | 2X std. | 2X std. | 0.5 dicumyl peroxide | 32 | 7 |
| 158 | 80 $Cp_2$ | 15 4-methylstyrene divinylbenzene | 2X std. | 2X std. | 0.5 dicumyl peroxide | 32 | 12 |
| 159 | 90 $Cp_2$ | 10 dimethanohexa-hydronaphthalene | std. | std. | 0.5 tert-butyl peroctoate 0.5 dicumyl peroxide | 31 | 9 |
| 160 | 80 $Cp_2$ | 10 dimethanohexa-hydronaphthalene 10 divinylbenzene | std. | std. | same | 31 | 17 |
| 161 | 90 $Cp_2$ | 10 trimethylolpropane-trimethacrylate | std. | std. | same | 31 | 7 |
| 162 | 90 $Cp_2$ | 7 4-methylstyrene 3 divinylbenzene | 2X std. | 2X std. | 0.5 tert-butyl peroctoate 0.5 dicumyl peroxide 0.5 N,N-diethylaniline | 31 | 26 |
| 163 | 80 $Cp_2$ | 15 4-methylstyrene 5 divinylbenzene | 2X std. | 2X std. | 0.5 tert-butyl peroctoate 0.5 dicumyl peroxide | 30 | 60 |
| 164 | same | same | Bell | tributyl-tin hydride | 0.5 2,2'-azobis(2-methyl-butyronitrile) 0.5 dicumyl peroxide | 30 | 6 |
| 165 | 100 $Cp_2$ | none | Bell | tributyl-tin hydride | same | 28 | 1–2 |
| 166 | 90 $Cp_2$ | 10 dimethanohexa-hydronaphthalene | Bell | tributyl-tin hydride | same | 28 | 1–2 |
| 167 | 90 $Cp_2$ | 10 isobornyl methacrylate | Bell | tributyl-tin hydride | same | 26 | 1–2 |
| 168 | 90 $Cp_2$ | 7.5 4-methylstyrene 2.5 divinylbenzene | std. | std. | 0.5 2,2'-azobis(2-methyl-butyronitrile) 0.5 azo-tert-butane | 29 | 3 |
| 169 | 87.6 $Cp_2$ | 10 isobornyl methacrylate 2.4 trimethylolpropane-trimethacrylate | 2X std. | 2X std. | 0.6 dicumyl peroxide 0.6 2,2'-azobis(2-methyl-butyronitrile) | 1.4 | 10 |

| Ex. Number | Seconds to 100° C. | Maximum Temp. °C. | % Residual $Cp_2$ | % Residual Other Monomer | Glass Transition Temp. °C. | Notes |
|---|---|---|---|---|---|---|
| 145 | 26 | 207 | 2.51 | — | 108 | — |
| 146 | 27 | 210 | 2.98 | — | 104 | — |
| 147 | 28 | 214 | 2.28 | — | 113 | — |
| 148 | 34 | 210 | 0.46 | — | 115 | — |
| 149 | 24 | 213 | 1.84 | — | 123 | — |
| 150 | 22 | 205 | 2.56 | — | 114 | — |
| 151 | 33 | 202 | 6.87 | — | — | duplicate run had Tg 85° C. |
| 152 | 27 | 214 | 0.43 | — | 112 | — |
| 153 | 23 | 214 | 0.62 | — | 130 | — |
| 154 | 32 | 184 | 7.40 | — | 73 | — |
| 155 | 97 | 184 | 4.48 | — | 76 | — |
| 156 | 30 | 207 | 0.63 | — | 46 | — |
| 157 | 140 | 159 | 9.97 | — | 53 | — |
| 158 | 28 | 220 | 1.08 | — | 51 | — |
| 159 | 50 | 225 | 0.99 | — | 138 | — |
| 160 | 66 | 228 | 1.32 | — | 108 | — |
| 161 | — | 185 | 8.91 | — | 73 | Temperature to 37° C. in 5 minutes, then heated to |

TABLE 4-continued

Metathesis - Free Radical Copolymerization

Conventions as in Tables 1, 2 and 3. Azobis means 2,2'-azobis(2-methylpropionitrile). Solids were put in the tube first. The free radical sources were dissolved in the monomers first.

| | | | | | | |
|---|---|---|---|---|---|---|
| | | | | | | 72° C. to get exotherm. |
| 162 | 127 | 202 | 1.50 | 2.37 4-methyl-styrene | 59 | Metathesis activator and N,N-diethylaniline combined before addition. |
| 163 | 274 | 179 | 2.66 | 0.66 divinyl-benzene | none observed | — |
| 164 | 63 | 164 | 0.20 | — | 90.7 | 25% larger than original volume. |
| 165 | 62 | 200 | 0.86 | — | 137 | — |
| 166 | 65 | 217 | 0.75 | — | 177 | — |
| 167 | 113 | 178 | 1.72 | — | 136 | — |
| 168 | 24 | 189 | 0.42 | — | 91 | — |
| 169 | 110 | 149 | 2.64 | 0,52 isobornyl methacry-late 0.07 trimethyl propane tri-acrylate | — | — |

TABLE 5

Metathesis - Hydrosilation

The catalyst for a 5 ml polymerization was 0.06 ml containing 0.045 ml standard catalyst (0.02 mmole W), containing one diphenyldichloromethane per W and 0.0165 ml platinum/siloxane complex in silicon fluid (3% Pt).
Other convention as in Tables 1 & 2.

| Example Number | $Cp_2$ & $Cp_3$ | Other Monomer | Metathesis + Hydrosil. Catalyst | Moderator | Activator | Initial Temp °C. | Seconds to Gel | Seconds to 100° C. |
|---|---|---|---|---|---|---|---|---|
| 170 | 90 $Cp_2$ | 10 methylhydrocy cio-siloxanes | std. + Pt | 0.25% maleic anhydride | std. | 31 | 20 | — |
| 171 | 90 $Cp_2$ | 10 methyl-hydrocyclo-siloxanes | 2X (std. + Pt) | 0.25% maleic anhydride | 2X std. | 31 | 12 | — |
| 172 | 80 $Cp_2$ | 20 methyl-hydrocyclo-siloxanes | std. + Pt. | 0.25% maleic anhydride | std. | 32 | 19 | — |
| 173 | 80 $Cp_2$ | 20 methyl-hydrocyclo-siloxanes | 2X (std. + Pt.) | 0.25% maleic anhydride | 2X std. | 31 | 15 | 315 |
| 174 | 90 $Cp_2$ | 10(15–18%)methyl-hydro(82–85%)di-methyl-siloxane copolymer | std. + Pt. | 1.0% maleic anhydride | std. | 32 | 9 | 70 |
| 175 | 90 $Cp_2$ | 10(3–4%)methyl-hydro-(96–97%)dimethyl-siloxane copolymer | std. + Pt. | 1.0% maleic anhydride | std. | 32 | 8–9 | 99 |
| 176 | 100 $Cp_2$ | none | std. + Pt | 1.0% maleic anhydride | std. | 32 | 8 | — |
| 177 | 100 $Cp_2$ | none | std. + Pt | none | std. | 32 | 3 | 81 |

| Example Number | Maximum Temp °C. | % Residual $Cp_2$ | % Residual Other Monomer | Glass Trans. Temp °C. | Notes |
|---|---|---|---|---|---|
| 170 | 214 | 0.20 | — | 86 | After 5 minutes, heated to 45° C. to get exotherm. Hydrosilation 33% complete by solid state $^{29}Si$ NMR. |
| 171 | 221 | 0.05–0.07 | 0.30 silane | 85 | 37° C. after 5 minutes, then heated to 40° C. to get exotherm. Hydrosilation 45% complete by solid state $^{29}Si$ NMR. |
| 172 | 214 | 0.29 | — | 76 | Heated to 50° C. after 5 minutes to get exotherm. Hydrosilation 36% complete by solid state $^{29}Si$ NMR. |
| 173 | 189 | 0.15 | — | 82 | Hydrosilation 42% complete by |

TABLE 5-continued

Metathesis - Hydrosilation

The catalyst for a 5 ml polymerization was 0.06 ml containing 0.045 ml standard catalyst (0.02 mmole W), containing one diphenyldichloromethane per W and 0.0165 ml platinum/siloxane complex in silicon fluid (3% Pt).
Other convention as in Tables 1 & 2.

| | | | | | |
|---|---|---|---|---|---|
| | | | | | solid state $^{29}Si$ NMR. |
| 174 | 190 | 0.20 | — | 144 | Two extractions overnight with methylene chloride removed 9.5%. |
| 175 | 187 | 0.34 | — | 152 | Two extractions overnight with methylene chloride removed 10.8%. |
| 176 | 205 | 0.23 | — | 141 | Went from 32° C. to 41° C. in 5 minutes. Heating to 50° C. gave the exotherm. Two extractions overnight with methylene chloride removed 1.2%. |
| 177 | 207 | 0.33 | — | 136 | |

Table 1 provides data for Examples 1 through 67. The combination of metathesis polymerization procatalyst, metathesis polymerization procatalyst activator, Lewis Acid catalyst, and Lewis Acid cocatalyst are well-represented by Examples 28, 34, 35, 37, 39, 40, 43, 44, 46, 51–58. and 66. The results given in Table 1 indicate that the use of a Lewis acid together with a Lewis acid cocatalyst can produce a level of residual dicyclopentadiene of less than 0.25 weight percent. The low residual dicyclopentadiene monomer is also obtained with a variety of metathesis polymerization procatalysts, as well as a variety of metathesis polymerization procatalyst activators. A variety of Lewis acid catalysts and cocatalysts can also be used. A variety of moderators can be used to control the rate of the polymerization. The polymerization can also be run in a molding machine to give a low-odor polymer with good physical properties. Various levels of the catalyst components can also be used.

Table 2 provides data for Examples 68 through 137, involving a copolymerization utilizing, in combination, a metathesis polymerization procatalyst, a metathesis polymerization procatalyst activator, a Lewis acid catalyst, and a Lewis acid cocatalyst. Copolymerization and/or alkylation using the combination of a metathesis polymerization procatalyst, a metathesis polymerization procatalyst activator, a Lewis Acid catalyst, and a Lewis Acid cocatalyst, is well-represented by Examples 71, 75, 76, 77–82, 85–97, 101, 106–108, 112–113, 118, 122, 124, 126, 128, 131, and 134. Most of the Examples provided in Table 2 utilize dicyclopentadiene as the principal monomer, together with an additional monomer or alkylation compound. The results provided in Table 2 indicate that copolymerization and alkylation are possible. A variety of comonomers and materials to be alkylated can be used. Various catalyst systems at various levels are possible. Very low levels of residual monomers can be obtained, as low as zero for the combination of dicyclopentadiene and 5-ethylidene-2-norbornene. The rate of polymerization can be controlled by the starting temperature and the ligand on the Lewis acid. The method is also applicable to mixtures of dicyclopentadiene and tricyclopentadiene. Antioxidants can be alkylated, and various levels of antioxidants can be used. Antioxidants can be partially linked to the polymer to reduce losses by evaporation or extrusion from a finished object.

Table 3 provides various data for Examples 138 through 144, each of which utilizes a combination of metathesis polymerization and anionic polymerization of dicyclopentadiene, either alone or in combination with caprolactone or hexamethylcyclotrisiloxane. The combination of a metathesis polymerization procatalyst, a metathesis polymerization procatalyst activator, and anionic polymerization catalyst are well-represented by Examples 140, 141, and 144. The results given in Table 3 indicate that anionic polymerization and metathesis polymerization can be carried out in a manner so that they are compatible with one another. More than one catalyst system can be used. More than one comonomer can be used. It is possible to prepare "soft" polymers within "hard" polymers, which should improve the impact strength, compared with the "hard" polymer alone.

Table 4 relates to metathesis-free radical copolymerization, and provides data for Examples 145 through 169. The combination of metathesis polymerization procatalyst, a metathesis polymerization procatalyst activator, and a free radical polymerization initiator is well-represented by Examples 147, 152, 162, and 169. The results given in Table 4 indicate that metathesis and free radical polymerizations can be carried out in a manner compatible with one another. A variety of free radical initiators can be used. More than one type of comonomer can be used.

Table 5 relates to a combination of metathesis polymerization and hydrosilation polymerization, and provides data for Examples 170 through 177. The combination of a metathesis polymerization procatalyst, a metathesis polymerization procatalyst activator, and a free radical polymerization initiator is well-represented by Examples 170–173, and 176–177. The results given in Table 5 indicate that metathesis and hydrosilation polymerization can be carried out in a manner in which they are compatible with one another. Furthermore, the combination of metathesis polymerization and hydrosilation polymerization can be used to produce a polymeric product having a low level of residual dicyclopentadiene monomer.

Finally, although the invention has been described with reference to particular means, materials and embodiments, it should be noted that the invention is not limited to the particulars disclosed, and extends to all equivalents within the scope of the claims.

What is claimed is:

1. A polymer comprising the reaction product of:

A. a polyolefin comprising repeating units of a metathesis polymerizable olefin;

B. a metathesis polymerization procatalyst and a metathesis polymerization procatalyst activator; and C. at least one member selected from the group consisting of:

i. a Lewis acid catalyst, and a Lewis acid cocatalyst, effective to obtain a residual metathesis polymerizable olefin monomer level of from about 0 to 0.25 weight percent, based on the weight of the polyolefin;

ii. an anionic polymerization catalyst;

iii. a free radical polymerization initiator; and iv. a hydrosilation polymerization catalyst and a monomer comprising a hydrosilane group.

2. The polymer as described in claim 1, wherein the polymer has a residual metathesis polymerizable olefin monomer level of from 0 to 0.25 weight percent, based on the weight of the polyolefin.

3. The polymer as described in claim 2, wherein:

(a) the Lewis acid catalyst comprises at least one member selected from the group consisting of a boron halide, a tin halide, an aluminum halide, a titanium halide, an antimony halide, a bismuth halide, an iron halide, a zinc halide, a zirconium halide, boron trifluoride etherate, boron trifluoride-N,N-diethylaniline, boron trifluoride-tetrahydrofuran, tin (IV) chloride, tin(IV) bromide, boron trifluoride quinuclidine, a polymeric Lewis acid, a protonic acid, a cation generator, and ionizing radiation; and (b) the Lewis acid cocatalyst comprises at least one member selected from the group consisting of alkyl halide, aryl halide, isobutyl chloride, tert-butyl chloride, benzyl chloride, vinylbenzyl chloride, 1-bromodecane, 2-ethylhexyl chloride, 2-ethylhexyl bromide, t-butyl acetate, chlorodiphenylmethane, and a polymeric chloride.

4. The polymer as described in claim 3, the polyolefin comprising dicyclopentadiene.

5. The polymer as described in claim 4, prepared using the Lewis acid catalyst and the Lewis acid cocatalyst.

6. The polymer as described in claim 5, wherein the polymer is prepared with a polymerization reaction rate moderator.

7. The polymer as described in claim 6, the reaction rate moderator comprising at least one member selected from the group consisting of butyl ether, di-n-butyl ether, n-hexyl ether, dimethyl ether of diethylene glycol (diglyme), butyl diglyme, ethyl benzoate, maleic anhydride, alkylzinc compounds, aniline, dialkylaniline, alkylaniline, N-alkylaniline, N-ethylaniline, N,N-diethylaniline, alkyl arylamines, triethylanime, hexamethylene tetramine, indoline, ethylpiperidine, methylpiperidine, pyridine, 2,4,6-trimethylpyridine, borontrifluoride pyridine, borontrifluoride-2,6-dimethylpyridine, 2-,3-,4-disubstituted pyridines, 3,4-disubstitutedpyridines, 2-,2,3,-di-substituted pyrazines, 2,5-di-substituted pyrazines, quinoline, isoquinoline, quinoxaline, quinuclidine, phenanthridine, pyrimidine, tributylphosphine, triphenylphosphosphine, 1,4-diazabicyclo[2.2.2]octane, trialkyl phosphites, trimethylphosphite, triethylphosphite, triisopropylphosphite, tributylphosphite, triisobutylphosphite, tripentyl phosphite, trihexylphosphite, triheptylphosphite, triisooctyl phosphite, trineodecyl phosphite, norbornene phosphites, tris(5-norbornenyl-2-methyl) phosphite, isooctyldiphenyl phosphite, diethyl ethylenepyrophosphite, tetraethyl pyrophosphite, di isodecylpentaerythritol diphosphite, tris(2-chloroethyl)phosphite, diethyl chlorophosphite, ethyl dichlorophosphite, ethylene chlorophosphite, tridodecyl trithiophosphite, 1,2-phenylenephosphorochloridite, diisopropyl phenylphosphonite, diethylphenyl phosphonite, ethyl diphenylphosphonite, trialkyl phosphates, triethyl phosphate, tributyl phosphate, tricresylphosphate, norbornene phosphates, tris(5-norbornenyl-2-methyl) phosphate, triaryl phosphates, triphenylphosphate, and butylated triphenyl phosphate.

8. The polymer as described in claim 5, comprising a residual metathesis polymerizable olefin monomer level of from about 0 to 0.15 weight percent, based on the weight of the polyolefin.

9. The polymer as described in claim 8, wherein the monomer in addition to dicyclopentadiene comprises at least one member selected from the group consisting of: tricyclopentadiene, norbornene, 1,3-diisopropenylbenzene, 1,4-diisopropenylbenzene, $\alpha$-methylstyrene, pinene, 5-ethylidene-2-norbornene, $\beta$-pinene, polyisoprene, diisobutylene, polyindane, acenaphthylene, 5,5'-sulfonyl-bis(2-norbornene), hexamethylene-bis(5-norbornene-2-carboxylate), 1,4,5,8-dimethano-1,4,4a,5,8,8a-hexahydronaphthalene, 1,5-cyclooctadiene, 1,5,9-cyclododecatriene, hexamethylcyclotrisiloxane, 4-methylstyrene, and poly(vinylbenzyl chloride).

10. The polymer as described in claim 8, wherein the composition is prepared from:

i.

(a) a Lewis acid catalyst comprising at least one member selected from the group consisting of boron trifluoride etherate, boron trifluoride-N,N-diethylaniline, and boron trifluoride-tetrahydrofuran; and (b) a Lewis acid cocatalyst comprising at least one member selected from the group consisting of isobutyl chloride, tert-butyl chloride, benzyl chloride, vinylbenzyl chloride, 1-bromodecane, 2-ethylhexyl bromide, and 2-ethylhexyl chloride;

ii.

(a) an additional monomer or compound comprising at least one member selected from the group consisting of m-diisopropenylbenzene, p-diisopropenylbenzene, $\alpha$-methylstyrene, 5-ethylidene-2-norbornene, naphthalene, $\beta$-pinene, 2,6-di-tert-butylphenol, polyisoprene, diphenylamine, diisobutylene, polyindane, poly(vinylbenzylchloride), acenaphthylene, 1,4,5,8-dimethano-1,4,4a,5,8,8a-hexahydronaphthalene, N,N'-diphenyl-p-phenylenediamine, 1,5-cyclooctadiene, 1,5,9-cyclododecatriene, hexamethylene-bis(5-norbornene-2-carboxylate), dimethanohexahydronaphthalene, poly(dicyclopentadiene), and hexamethylcyclo-trisiloxane; and (b) a Lewis acid cocatalyst comprising at least one member selected from the group consisting of isobutyl chloride, tert-butyl chloride, 2-ethylhexyl chloride, and 2-ethylhexyl bromide;

iii. a free radical polymerization initiator comprising a mixture of 2,2'-azobis(2-methyl-butyronitrile) and dicumyl peroxide; and iv. a hydrosilation polymerization catalyst together with at least one member selected from methylhydrocyclosiloxanes and a methylhydrodimethylsiloxane copolymer.

11. The polymer as described in claim 5, comprising the reaction product prepared with the following:

repeating units of dicyclopentadiene in an amount of from about 1 to 99 weight percent, based on the weight of the polyolefin;

the metathesis polymerization procatalyst in a molar ratio of metathesis polymerization procatalyst-:metathesis polymerizable olefin of from about 1:500 tp 1:15,000;

the metathesis polymerization procatalyst activator in an amount within the group selected from: a molar ratio of Sn:W of from about 1.5:1 to 1:1, and a molar ratio of Al:W of from about 2:1 to 4:1;

the Lewis acid catalyst in an amount of from about 0.1 to 5 weight percent, based on weight of monomer polymerizable with a Lewis acid catalyst; and the Lewis acid cocatalyst in an amount of from about 0.05 to 5 weight percent, based on weight of monomer polymerizable with a Lewis acid catalyst.

12. The polymer as described in claim 11, comprising the reaction product prepared with the following:

the repeating units of dicyclopentadiene in an amount of from about 10 to 95 weight percent, based on the weight of the polyolefin;

the metathesis polymerization procatalyst in a molar ratio of metathesis polymerization procatalyst-:metathes is polymerizable olefin of from about 1:1000 to 1:3000;

the metathesis polymerization procatalyst activator in an amount within the group selected from: a molar ratio of Sn:W of from about 2:1 to 6:1, and a molar ratio of Al:W of from about 2.5:1 to 3.5:1;

the Lewis acid catalyst in an amount of from about 0.25 to 2 weight percent, based on weight of monomer polymerizable with a Lewis acid catalyst; and the Lewis acid cocatalyst in an amount of from about 0.2 to 2 weight percent, based on weight of monomer polymerizable with a Lewis acid catalyst.

13. The polymer as described in claim 12, comprising the reaction product prepared with the following:

repeating units of dicyclopentadiene in an amount of from about 75 to 90 weight percent, based on the weight of the polyolefin;

the metathesis polymerization procatalyst in the composition in a molar ratio of metathesis polymerization procatalyst:metathesis polymerizable olefin of from about 1:1500 to 1:3000;

the metathesis polymerization procatalyst activator in an amount within the group selected from: a molar ratio of Sn:W of from about 2:1 to 3:1, and a molar ratio of Al:W of from about 2.75:1 to 3.25:1;

the Lewis acid catalyst in an amount of from about 0.5 to 1 weight percent, based on weight of monomer polymerizable with a Lewis acid catalyst; and the Lewis acid cocatalyst in an amount of from about 0.25 to 0.5 weight percent, based on weight of monomer polymerizable with a Lewis acid catalyst.

14. The polymer as described in claim 11, wherein:

the metathesis polymerization procatalyst comprises at least one member selected from the group consisting of tungsten halide, tungsten oxyhalide, molybdenum halide, molybdenum oxyhalide, rhenium halide, rhenium oxyhalide, tantalum halide, tantalum oxyhalide, niobium halide, and niobium oxyhalide; and the metathesis polymerization procatalyst activator comprises at least one member selected from the group consisting of an alkylaluminum compound, an alkylzinc compound an alkyltin compound, an alkylmagnesium compound, an alkyllithium compound, and a tin hydride.

15. The polymer as described in claim 14, wherein:

the metathesis polymerization procatalyst comprises at least one member selected from the group consisting of a tungsten halide, a tungsten oxyhalide, a molybdenum halide, and a molybdenum oxyhalide, and a tungsten catalyst complex having the formula:

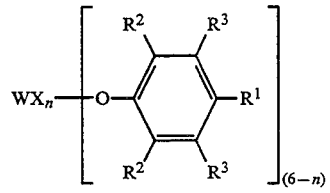

wherein:

X comprises at least one member selected from the group consisting of Cl and Br;

n comprises at least one member selected from the group consisting of 2 and 3;

$R^1$ comprises at least one member selected from the group consisting of H, Cl, an alkyl group having 1–10 carbons, an alkoxy group having 1 to 8 carbons, and a phenyl group;

$R^2$ comprises at least one member selected from the group consisting of H, a halogen, and an alkyl group having 1 to 9 carbon atoms; and $R^3$ comprises at least one member selected from the group consisting of H, an alkyl group having 1 to 10 carbon atoms, a tin activator compound having the formula $R_3SnH$, where R is an alkyl group having 1 to 10 carbon atoms, and a phenyl group; and the metathesis polymerization procatalyst activator comprises at least one member selected from the group consisting of a trialkylaluminum compounds, a dialkylaluminum halide, an alkylaluminum dihalide wherein the alkyl groups contain from 1 to 12 carbon atoms, triethylaluminum, diethylaluminum chloride, ethylaluminum dichloride, ethylaluminum chloride n-propoxide, a mixture of tri-n-octylaluminum:dioctylaluminum iodide:diglyme, tributyltin hydride, tetrabutyl tin, and t-butyl chloride.

16. A method for making a polyolefin, comprising:

A. combining a metathesis polymerizable olefin monomer with a metathesis polymerization procatalyst, a metathesis polymerization procatalyst activator, and at least one member selected from the group consisting of:

i. a Lewis acid catalyst, and a Lewis acid cocatalyst, efffective to obtain a residual metathesis polymerizable olefin monomer level of from 0 to 0.25 weight percent, based on the weight of the polyolefin;

ii. an anionic polymerization catalyst;

iii. a free radical polymerization initiator; and iv. a hydrosilation polymerization catalyst and a monomer comprising a hydrosilane group;

B. polymerizing the metathesis polymerizable olefin.

17. The method as described in claim 16, wherein the polyolefin comprises a residual metathesis polymerizable olefin monomer level of from 0 to 0.25 weight percent, based on the weight of the polyolefin.

18. The method as described in claim 17, wherein:

(a) the Lewis acid catalyst comprises at least one member selected from the group consisting of a boron halide, a tin halide, an aluminum halide, a titanium halide, an antimony halide, a bismuth halide, an iron halide, a zinc halide, a zirconium halide, boron trifluoride etherate, boron trifluoride-N,N-diethylaniline, boron trifluoride-tetrahydrofuran, tin (IV) chloride, tin(IV) bromide, boron trifluoride quinuclidine, a polymeric Lewis acid, a protonic acid, a cation generator, and ionizing radiation; and (b) the Lewis acid cocatalyst comprises at least one member selected from the group consisting of alkyl halide, aryl halide, isobutyl chloride, tertbutyl chloride, benzyl chloride, vinylbenzyl chloride, 1-bromodecane, 2-ethylhexyl chloride, 2-ethylhexyl bromide, t-butyl acetate, chlorodiphenylmethane, and a polymeric chloride.

19. The method as described in claim 18, wherein the polyolefin comprises dicyclopentadiene.

20. The method as described in claim 19, comprising a residual metathesis polymerizable olefin monomer level of from about 0 to 0.15 weight percent, based on the weight of the polyolefin.

21. The method as described in claim 20, wherein a monomer in addition to dicyclopentadiene is present and comprises at least one member selected from the group consisting of: tricyclopentadiene, norbornene, 1,3-diisopropenylbenzene, 1,4-diisopropenylbenzene, α-methylstyrene, pinene, 5-ethylidene-2-norbornene, β-pinene, polyisoprene, diisobutylene, polyindane, acenaphthylene, 5,5′-sulfonyl-bis(2-norbornene), hexamethylene-bis(5-norbornene-2-carboxylate), 1,4,5,8-dimethyano-1,4,4a,5,8,8a-hexahydronaphthalene, 1,5-cyclooctadiene, 1,5,9-cyclododecatriene, hexamethylcyclo-trisiloxane, 4-methylstyrene, and poly(vinylbenzyl chloride).

22. The method as described in claim 20, wherein at least one member selected from the group consisting of:

i.

(a) a Lewis acid catalyst comprising at least one member selected from the group consisting of boron trifluoride etherate, boron trifluoride-N,N-diethylaniline, and boron trifluoride-tetahydrofuran; and (b) a Lewis acid cocatalyst comprising at least one member selected from the group consisting of isobutyl chloride, tert-butyl chloride, benzyl chloride, vinylbenzyl chloride, 1-bromodecane, 2-ethylhexyl bromide, and 2-ethylhexyl chloride;

ii.

(a) an additional monomer or compound comprising at least one member selected from the group consisting of m-diisopropenylbenzene, p-diisopropenylbenzene, α-methylstyrene, 5-ethylidene-2-norbornene, naphthalene, β-pinene, 2,6-di-tert-butylphenol, polyisoprene, diphenylamine, diisobutylene, polyindane, poly(vinylbenzylchloride), acenaphthylene, 1,4,5,8-dimethano-1,4,4a,5,8,8a-hexahydronaphthalene, N,N′-diphenyl-p-phenylenediamine, 1,5-cyclooctadiene, 1,5,9-cyclododecatriene, hexamethylene-bis(5-norbornene-2-carboxylate), dimethanohexahydronaphthalene, poly(dicyclopentadiene), and hexamethylcyclo-trisiloxane; and (b) a Lewis Acid cocatalyst comprising at least one member selected from the group consisting of isobutyl chloride, tert-butyl chloride, 2-ethylhexyl chloride, and 2-ethylhexyl bromide;

iii. a free radical polymerization initiator comprising a mixture of 2,2′-azobis(2-methyl-butyronitrile) and dicumyl peroxide; and iv. a hydrosilation polymerization catalyst together with at least one member selected from methylhydrocyclosiloxanes and a methylhydrodimethylsiloxane copolymer;

is combined with the metathesis polymerizable olefin, the metathesis polymerization procatalyst, and the metathesis polymerization procatalyst activator.

23. The method as described in claim 19, further comprising:

A. providing a plurality of reactant streams, wherein a first reactant stream comprises the metathesis polymerization procatalyst activator and a portion of the metathesis polymerizable olefin, and a second reactant stream comprises the metathesis polymerization procatalyst and a portion of the the metathesis polymerizable olefin, wherein at least one reactant stream further comprises at least one member selected from the group consisting of:

i. a Lewis acid catalyst and a Lewis acid cocatalyst, present in separate reactant streams;

ii. an anionic polymerization catalyst;

iii. a free radical polymerization initiator;

iv. a hydrosilation polymerization catalyst; and

B. mixing the reactant streams together whereby a reaction mixture is formed;

C. forming the reaction mixture into a desired shape before the polymerization of the metathesis polymerizable olefin.

24. The process as described in claim 23, wherein the step of forming the reaction mixture into a desired shape is carried out by injecting the reaction mixture into a mold cavity, and wherein the reaction mixture is allowed to polymerize to a degree of substantial reaction termination while the reaction mixture is within the mold, whereby a molded article is produced, followed by removing the molded article from the mold.

25. The process as described in claim 24, wherein the number of reactant streams is from two to four.

26. The method as described in claim 19, wherein the Lewis acid catalyst and the Lewis acid cocatalyst are combined with the metathesis polymerizable olefin, the metathesis polymerization procatalyst, and the metathesis polymerization procatalyst activator.

27. The method as described in claim 26, wherein a polymerization reaction rate moderator is combined with the metathesis polymerizable olefin, the metathesis polymerization procatalyst, the metathesis polymerization procatalyst activator, the Lewis acid catalyst, and the Lewis acid cocatalyst.

28. The method as described in claim 27, the polymerization reaction rate moderator comprising at least one member selected from the group consisting of butyl ether, di-n-butyl ether, n-hexyl ether, dimethyl ether of diethylene glycol (diglyme), butyl diglyme, ethyl benzoate, maleic anhydride, alkylzinc compounds, aniline, dialkylaniline, alkylaniline, N-alkylaniline, N-ethylaniline, N,N-diethylaniline, alkyl arylamines, triethylanime, hexamethylene tetramine, indoline, ethylpiperidine, methylpiperdine, pyridine, 2,4,6-trimethylpyridine, borontrifluoride pyridine, borontrifluoride-2,6-dimethylpyridine, 2-,3-,4-disubstituted pyridines, 3,4-disubstituted pyridines, 2-,2,3,-di-substituted pyrazines, 2,5-disubstituted pyrazines, quinoline, isoquinoline, quinoxaline, quinuclidine, phenanthridine, pyrimidine, tributylphosphine, triphenylphosphosphine, 1,4-dizabicyclo[2.2.2]octane, trialkyl phosphites, trimethylphosphite, triethylphosphite, triisopyropylphosphite, tributylphosphite, triisobutylphosphite, tripentyl phosphite, trihexylphosphite, trikeptylphosphite, triisooctyl phosphite, trineodecyl phosphite, norbornene phosphites, tris(5-norbornenyl-2-methyl)phosphite, isooctyldiphenyl phosphite, diethyl ethylenepyrophosphite, tetraethyl pyrophosphite, diisodecylpentaerythritol diphosphite, tris(2-chloroethyl)phosphite, diethyl chlorophosphite, ethyl dichlorophosphite, ethylene chlorophosphite, tridodecyl trithiophosphite, 1,2-phenylenephosphorochloridite, diisopropyl phenylphosphonite, diethylphenyl phosphonite, ethyl diphenylphosphonite, trialkyl phosphates, triethyl phosphate, tributyl phosphate, tricresylphosphate, norbornene phosphates, tris(5-norbornenyl-2-methyl)phosphate, triaryl phosphates, triphenylphosphate, and butylated triphenyl phosphate.

29. The method as described in claim 26, wherein:

repeating units of dicyclopentadiene are present in an amount of from about 1 to 100 weight percent, based on the weight of the polyolefin;

the metathesis polymerization procatalyst is present in a molar ratio of metathesis polymerization procatalyst:metathesis polymerizable olefin of from about 1:500 to 1:15,000;

the metathesis polymerization procatalyst activator is present in an amount within the group selected from: a molar ratio of Sn:W of from about 1.5:1 to 9:1, and a molar ratio of Al:W of from about 2:1 to 4:1;

the Lewis acid catalyst is present in an amount of from about 0.1 to 5 weight percent, based on weight of monomer polymerizable with the Lewis acid catalyst; and the Lewis acid cocatalyst is present in an amount of from about 0.05 to 5 weight percent, based on weight of monomer polymerizable with the Lewis acid catalyst.

30. The method as described in claim 29, wherein:

repeating units of dicyclopentadiene are present in an amount of from about 10 to 100 weight percent, based on the weight of the polyolefin;

the metathesis polymerization procatalyst is present in a molar ratio of metathesis polymerization procatalyst:metathesis polymerizable olefin of from about 1:1000 to 1:3000;

the metathesis polymerization procatalyst activator is present in an amount within the group selected from: a molar ratio of Sn:W of from about 2:1 to 6:1, and a molar ratio of Al:W of from about 2.5:1 to 3.5:1;

the Lewis acid catalyst is present in an amount of from about 0.25 to 2 weight percent, based on weight of monomer polymerizable with the Lewis acid catalyst; and the Lewis acid cocatalyst is present in an amount of from about 0.2 to 2 weight percent, based on weight of monomer polymerizable with the Lewis acid catalyst.

31. The method as described in claim 30, wherein:

repeating units of dicyclopentadiene are present in an amount of from about 75 to 100 weight percent, based on the weight of the polyolefin;

the metathesis polymerization procatalyst is present in the composition in a molar ratio of metathesis polymerization procatalyst:metathesis polymerizable olefin of from about 1:1500 to 1:3000;

the metathesis polymerization procatalyst activator is present in an amount within the group selected from: a molar ratio of Sn:W of from about 2:1 to 3:1, and a molar ratio of Al:W of from about 2.75:1 to 3.25:1;

the Lewis acid catalyst is present in an amount of from about 0.5 to 1 weight percent, based on weight of monomer polymerizable with the Lewis acid catalyst; and the Lewis acid cocatalyst is present in an amount of from about 0.25 to 0.5 weight percent, based on weight of monomer polymerizable with the Lewis acid catalyst.

32. The method as described in claim 29, wherein:

the metathesis polymerization procatalyst comprises at least one member selected from the group consisting of tungsten halide, tungsten oxyhalide, molybdenum halide, molybdenum oxyhalide, rhenium halide, rhenium oxyhalide, tantalum halide, tantalum oxyhalide, niobium halide, and niobium oxyhalide; and the metathesis polymerization procatalyst activator comprises at least one member selected from the group consisting of an alkylaluminum compound, an alkylzinc compound an alkyltin compound, an alkylmagnesium compound, an alkyllithium compound, and a tin hydride.

33. The method as described in claim 32, the metathesis polymerization procatalyst comprising at least one member selected from the group consisting of a tungsten halide, a tungsten oxyhalide, a molybdenum halide, and a molybdenum oxyhalide, and a tungsten catalyst complex having the formula:

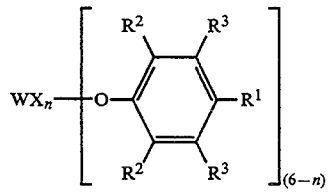

wherein:

X comprising at least one member selected from the group consisting of Cl and Br;

n comprises at least one member selected from the group consisting of 2 and 3;

$R^1$ comprises at least one member selected from the group consisting of H, Cl, an alkyl group having 1–10 carbons, an alkoxy group having 1 to 8 carbons, and a phenyl group;

$R^2$ comprises at least one member selected from the group consisting of H, a halogen, and an alkyl group having 1 to 9 carbon atoms; and $R^3$ comprises at least one member selected from the group consisting of H, an alkyl group having 1 to 10 carbon atoms, a phenyl group, and a tin activator compound having the formula $R_3SnH$, where R is an alkyl group having 1 to 10 carbon atoms, and a phenyl group; and the metathesis polymerization procatalyst activator comprising at least one member selected from the group consisting of trialkylaluminum compounds, a dialkylaluminum halide, an alkylaluminum dihalide wherein the alkyl groups contain from 1 to 12 carbon atoms, triethylaluminum, diethylaluminum chloride, ethylaluminum dichloride, ethylaluminum chloride n-propoxide, a mixture of tri-n-octylaluminum:dioctylaluminum iodide:diglyme, tributyltin hydride, tetrabutyl tin, and t-butyl chloride.

* * * * *